(12) United States Patent
Rieder et al.

(10) Patent No.: US 10,942,058 B2
(45) Date of Patent: **\*Mar. 9, 2021**

(54) VIBRATION-TYPE FLUID FLOW-RATE MEASURING SYSTEM HAVING TEMPERATURE COMPENSATION

(71) Applicant: Endress + Hauser Flowtec AG, Reinach (CH)

(72) Inventors: Alfred Rieder, Landshut (DE); Gerhard Eckert, Grenzach-Wyhlen (DE); Ennio Bitto, Aesch (CH); Hao Zhu, Freising (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 127 days.

This patent is subject to a terminal disclaimer.

(21) Appl. No.: 16/315,826

(22) PCT Filed: Jun. 26, 2017

(86) PCT No.: PCT/EP2017/065625
§ 371 (c)(1),
(2) Date: Aug. 26, 2019

(87) PCT Pub. No.: WO2018/007176
PCT Pub. Date: Jan. 11, 2018

(65) Prior Publication Data
US 2019/0376831 A1  Dec. 12, 2019

(30) Foreign Application Priority Data

Jul. 8, 2016  (DE) .................. 10 2016 112 599.7

(51) Int. Cl.
*G01F 1/84*  (2006.01)
*G01F 25/00*  (2006.01)
(Continued)

(52) U.S. Cl.
CPC ........ *G01F 25/0007* (2013.01); *G01F 1/8436* (2013.01); *G01F 1/8477* (2013.01);
(Continued)

(58) Field of Classification Search
CPC .................. G01F 25/00; G01F 1/84
See application file for complete search history.

(56) References Cited

U.S. PATENT DOCUMENTS

2006/0016273 A1\* 1/2006 Bitto .................. G01F 1/8413
73/861.355
2011/0029259 A1 2/2011 Cunningham et al.
(Continued)

FOREIGN PATENT DOCUMENTS

CN  20 2533123 U  11/2012
CN  10 3370605 A  10/2013
(Continued)

OTHER PUBLICATIONS

Office Action dated Apr. 17, 2020, issued in Chinese Application No. 201780042603.X.
(Continued)

*Primary Examiner* — Harshad R Patel
(74) *Attorney, Agent, or Firm* — Bacon & Thomas, PLLC

(57) ABSTRACT

The measuring system comprises a transducer apparatus with two tubes, each having a lumen surrounded by a wall. A fluid flows through each tube, while the tube is vibrated. An electromechanical-exciter mechanism maintains mechanical oscillations of each of the tubes, and a sensor arrangement registers mechanical oscillations of at least one of the tubes. The transducer apparatus includes two temperature sensors, each being mechanically and thermally conductively coupled with a wall of a respective one of the tubes and adapted to register a measuring point temperature and to convert such into a temperature measurement signal.
(Continued)

Figure 1:
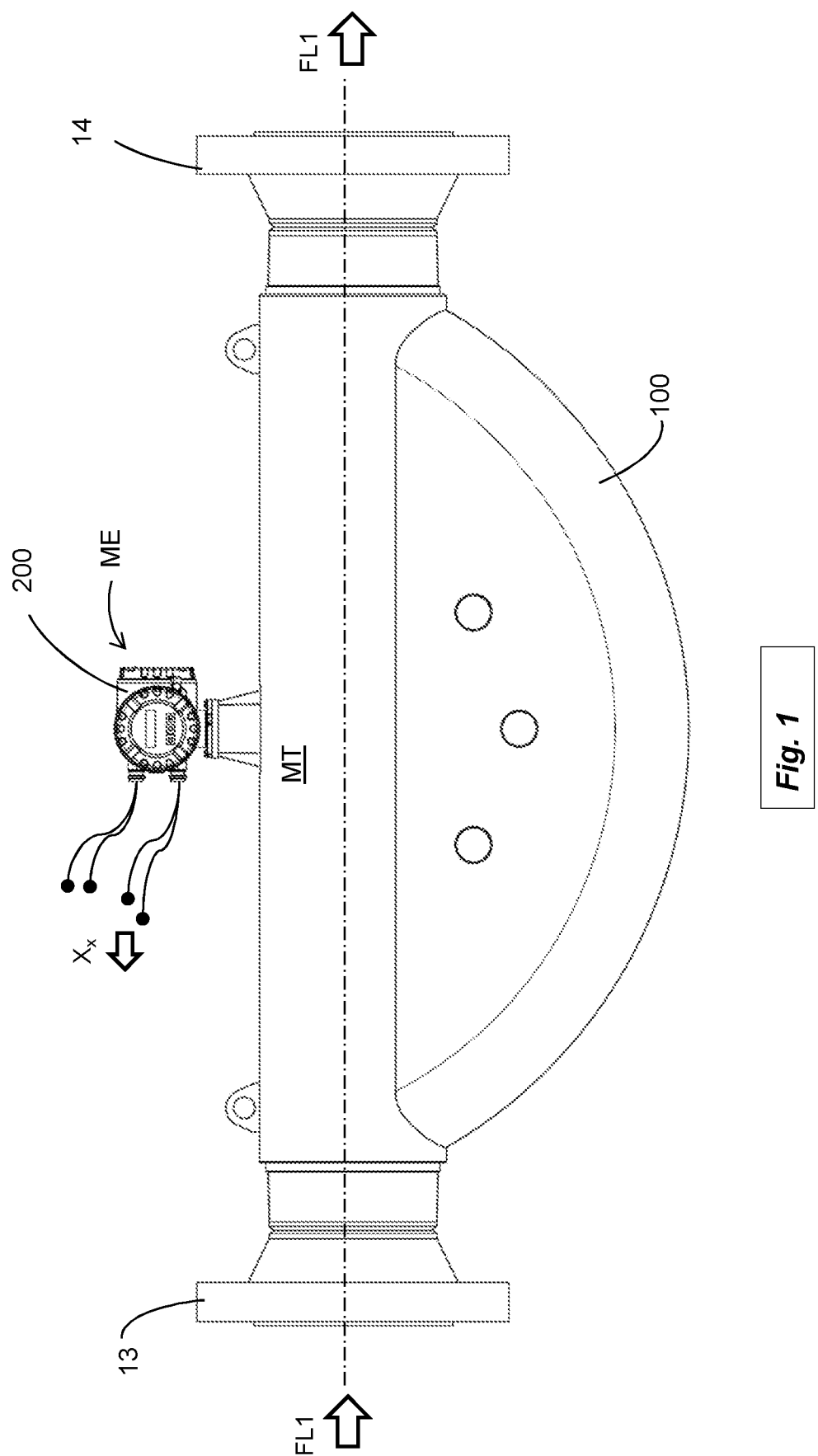

A measuring- and operating electronics is adapted, with application of the temperature measurement signals, to generate a transducer temperature measured value, which represents a transducer apparatus temperature, which deviates both from each of the measuring point temperatures, such that a magnitude of the transducer temperature measured value is between the measuring point temperatures.

39 Claims, 7 Drawing Sheets

(51) Int. Cl.
  *G01F 15/02* (2006.01)
  *G01N 11/16* (2006.01)
  *G01N 9/00* (2006.01)

(52) U.S. Cl.
  CPC .......... *G01F 1/8495* (2013.01); *G01F 15/022* (2013.01); *G01N 11/162* (2013.01); *G01N 2009/006* (2013.01)

(56) References Cited

U.S. PATENT DOCUMENTS

| | | | |
|---|---|---|---|
| 2013/0031973 A1* | 2/2013 | Kirst | G01N 17/008 73/204.11 |
| 2019/0323873 A1* | 10/2019 | Bitto | G01F 1/74 |
| 2019/0376831 A1* | 12/2019 | Rieder | G01F 1/8436 |
| 2020/0049543 A1* | 2/2020 | Rieder | G01F 1/8413 |

FOREIGN PATENT DOCUMENTS

| | | |
|---|---|---|
| DE | 42 24 379 C1 | 12/1993 |
| DE | 10 2013 202 967 B3 | 3/2014 |
| DE | 10 2014 103 427 A1 | 9/2015 |
| WO | 2016/010514 A1 | 1/2016 |

OTHER PUBLICATIONS

German Search Report, German PTO, Munich, dated Mar. 7, 2017.
International Search Report, EPO, The Netherlands, dated Sep. 22, 2017.

* cited by examiner

VIBRATION-TYPE FLUID FLOW-RATE MEASURING SYSTEM HAVING TEMPERATURE COMPENSATION

The invention relates to a vibronic measuring system, especially a vibronic measuring system for measuring a physical, measured variable of a fluid flowing in a pipeline.

In industrial measuring- and automation technology, often applied for highly accurate obtaining of measured values for at least one physical, measured variable of a fluid flowing in a pipeline are vibronic measuring systems, namely measuring systems formed by means of a vibronic, transducer apparatus. Examples of the physical, measured variable include substance parameters, such as, for instance, density, and/or flow parameters, such as, for instance, a mass flow rate, of a gas, a liquid or a dispersion. Especially common, in such case, are vibronic measuring systems, in the case of which the transducer apparatus comprises a first tube having a lumen surrounded by a wall, most often of metal, as well as a second tube having a lumen surrounded by a wall, also most often of metal, typically a second tube constructed equally to the first tube and extending parallel thereto, wherein each of the at least two tubes, in each case extending from a first, inlet end to a second, outlet end, is adapted to be flowed through in either direction by the fluid to be measured, starting from a first end and proceeding to a second end, an outlet end, and, during that, to be caused to vibrate essentially opposite-equally, and wherein the transducer apparatus is connected to a measuring- and operating-electronics formed, for example, by means of at least one microprocessor, and useful both for the active exciting as well as also for the evaluation of mechanical oscillations of the tubes. The measuring- and operating electronics can additionally be electrically connected via corresponding electrical lines also to a superordinated electronic data processing system, most often arranged spatially removed and most often also spatially distributed from the measuring system. The measured values produced by a measuring system are sent to the superordinated electronic data processing system near in time, for example, also in real time, by means of at least one measured value signal correspondingly carrying the measured values. Measuring systems of the type being discussed are additionally usually connected together and/or with corresponding electronic process controllers, for example, on-site installed, programmable logic controllers (PLCs) or process-control computers installed in a remote control room, by means of a data transmission network provided within the superordinated data processing system, where the measured values produced by means of a particular measuring system and suitably digitized and correspondingly coded, are forwarded. By means of such process-control computers, the transmitted measured values can be further processed and displayed as corresponding measurement results e.g. on monitors and/or converted into control signals for other field devices embodied as actuating devices, e.g. magnetically operated valves, electric motors, etc. Since modern measuring arrangements can most often also be directly monitored by such control computers and, in given cases, controlled and/or configured thereby, operating data intended for the measuring system are also dispatched from the control computers in corresponding manner via the aforementioned data transmission networks, which are most often hybrid as regards the transmission physics and/or the sending logic. Accordingly, the data processing system also usually serves to condition the measured value signal delivered by the measuring system corresponding to the requirements of downstream data transmission networks, for example, to digitize it suitably and, in given cases, to convert it into a corresponding telegram, and/or to evaluate it on-site. Provided in such data processing systems for such purpose, electrically coupled with the appropriate connecting lines, are evaluating circuits, which pre- and/or further process as well as, in case required, suitably convert the measured values received from a particular measuring system. Serving for data transmission in such industrial data processing systems, at least sectionally, especially serially, are fieldbusses, e.g. FOUNDATION FIELDBUS, RACKBUS-RS 485, PROFIBUS, etc., or, for example, also networks based on the ETHERNET standards as well as the corresponding, most often comprehensively standardized, transmission-protocols. Alternatively or supplementally in the case of modern measuring systems of the type being discussed, measured values can also be transmitted wirelessly per radio to the data processing system. Besides the evaluating circuits required for processing and converting the measured values delivered by the connected measuring systems, such superordinated data processing systems have most often also electrical supply circuits, which serve for supplying the connected measuring systems with electrical energy. These electrical supply circuits provide a corresponding supply voltage, in given cases, fed directly from the connected fieldbus to the electronics and drive the electrical currents flowing in electrical lines connected thereto as well as through the electronics. A supply circuit can, in such case, for example, be associated with exactly one measuring system, and with a corresponding electronics, and together with the evaluating circuit associated with a particular measuring system—, for example, combined into a corresponding fieldbus adapter—be accommodated in a shared electronics-housing, e.g. formed as a top hat rail module. It is, however, also quite usual to accommodate supply circuits and evaluating circuits each in separate, in given cases, mutually spatially remote, electronics housings and to wire such correspondingly together via external lines.

Construction and operation of vibronic, transducer apparatuses of the type being discussed, or of vibronic measuring systems formed therewith, for example, also formed as Coriolis-mass flow measuring devices or also as Coriolis-mass flow measuring systems, are known, per se, to those skilled in the art and disclosed, for example, also in US-A 2001/0037690, US-A 2004/0031328, US-A 2006/0161359, US-A 2010/0242623, US-A 2011/0113896, US-A 2011/0146416, US-A 2011/0265580, US-A 2012/0073384, U.S. Pat. Nos. 4,768,384, 7,549,319, WO-A 01/29519, WO-A 2009/134268, WO-A 2012/018323, WO-A 2012/033504, WO-A 2013/092104, which WO-A 2015/135738, WO-A 2015/135739, WO-A 88/02853, WO-A 94/21999, WO-A 96/07081 or WO-A 98/02725. In accordance therewith, such a transducer apparatus includes, in each case, an electromechanical-exciter mechanism formed by means of at least one oscillation exciter, for example, an electrodynamic, oscillation exciter. The electromechanical-exciter mechanism is adapted to excite, and to maintain, wanted oscillations of the at least two tubes, namely mechanical oscillations having at least one predeterminable oscillation frequency of each of the at least two tubes, about static resting positions of the tubes, for example, mechanical oscillations of each of the tubes about imaginary first and second oscillation axes imaginarily connecting the first ends with the second ends. Typically used in such case are electrodynamic oscillation exciters acting differential on the tubes, namely oscillation exciters formed by means of a permanent magnet affixed to one of the tubes and by means of an exciter coil affixed on the other of the at least two tubes and interacting with the permanent magnet. Regularly serving as wanted oscillations of the tubes are oscillations, which are suitable to induce in the flowing fluid Coriolis forces dependent on the mass flow rate, m, and/or which are suitable to induce in the flowing fluid friction-, or damping, forces dependent on viscosity, η, and/or which are suitable to induce in the flowing fluid inertial forces dependent on density, ρ. For registering mechanical oscillations of the at least two tubes, not least of all also the wanted oscillations and/or Coriolis oscillations resulting from the aforementioned Coriolis forces, the transducer apparatuses used in vibronic measuring systems of the type being discussed have, furthermore, in each case, an oscillation sensor arrangement formed by means of at least one, for example, electrodynamic or optical, oscillation sensor. The oscillation sensor arrangement is adapted to generate at least one oscillatory signal, namely an electrical measurement signal representing oscillatory movements of the at least two tubes, for example, an electrical measurement signal having an electrical (signal-)alternating voltage dependent on a velocity of the oscillatory movements of the tubes, or on a corresponding oscillation frequency. Also the oscillation sensors of such transducer apparatuses serving for registering oscillations can, for example, be embodied as electrodynamic-oscillation sensors differentially registering oscillatory movements of the at least two tubes.

Transducer apparatuses of the type being discussed include, furthermore, typically, a transducer-housing having a cavity surrounded by a wall, for example, a metal wall. Arranged within the transducer-housing are the at least two tubes including the thereon mounted components of the at least one oscillation exciter as well as of the at least one oscillation sensor in a manner enabling the above discussed oscillations of the tubes, in such a manner, namely, that between an inner surface of the wall of the transducer housing facing the cavity and an outer surface of the wall of the tube, namely an outer surface of the wall of the tube facing the cavity, an intermediate space is formed, most often an intermediate space filled with air or an inert gas. Additionally, the measuring- and operating-electronics is also typically accommodated within at least one comparatively robust, especially impact-, pressure-, and/or weather resistant, electronics housing. The electronics housing, for example, one manufactured of stainless steel or aluminum, can be arranged removed from the transducer system and connected with such via a flexible cable; it can, however, for example, also be directly arranged, or affixed, on the transducer apparatus, for example, on the above mentioned transducer housing.

The measuring- and operating electronics of such vibronic measuring systems is—not least of all for the case, in which the at least one measured value represents a density or viscosity of the fluid guided in the at least one tube—, further adapted to generate at least one measured value using the at least one oscillation signal, for example, in such a manner that the measuring- and operating electronics ascertains the at least one measured value based on a wanted frequency measured from the oscillation signal, namely an oscillation frequency of the wanted oscillations dependent on the measured variable to be measured and metrologically compensates a dependence of the wanted frequency also on a temperature distribution within the wall of the at least one tube. Selected as wanted frequency in the case of vibronic measuring systems of the type being discussed is most often one of the resonance frequencies present in the fluid-guiding, at least one measuring tube, typically, namely, a resonance frequency of a bending oscillation fundamental mode of the at least one measuring tube. Besides the evaluation of the at least one oscillation signal, the measuring- and operating electronics of vibronic measuring systems of the above discussed type serves typically also to generate at least one driver signal, for example, a harmonic and/or clocked, driver signal, for the at least one electromechanical-oscillation exciter. The driver signal can be controlled, for example, as regards an electrical current level and/or a voltage level and/or a signal frequency. In the case of vibronic measuring systems used in industrial measuring- and automation technology, the measuring- and operating electronics is most often implemented by means of one or more microprocessors formed, in given cases, even as digital signal processors (DSP), in such a manner that the measuring- and operating electronics ascertains measured values for the at least one substance—, or flow, parameter by numerical processing of measurement signals of the transducer apparatus, for example, based on digital, sampled values won from the at least one oscillatory signal and provided, especially also in real time, in the form of corresponding digital values.

In the case of transducer apparatuses of the type being discussed, or vibronic measuring systems formed therewith, another, (auxiliary-) measured variable, among others, also a transducer apparatus temperature, can be important for the operation, not least of all also for the precise ascertaining of the measured values for the at least one substance—, or flow, parameter. Thus, the transducer apparatus temperature is suitable for characterizing a thermodynamic state of the transducer apparatus, and the influence of such state on the oscillation characteristics of the transducer apparatus relevant for measuring the at least one substance—, or flow, parameter (i.e. a target temperature). Especially, the transducer apparatus temperature should be suitable to enable metrological compensation of a dependence of the wanted frequency on a spatial temperature distribution within the transducer apparatus, a compensation sufficient for the desired high accuracy of measurement, with which the measured values for the at least one measured variable (not least of all also the measured values for density and/or viscosity ascertained by means of computer based, real time calculation) are to be ascertained. The transducer apparatus temperature is in the case of measuring systems of the type being discussed ascertained regularly based on at least one tube temperature registered on the wall of at least one of the tubes. For registering the tube temperature, such transducer apparatuses can, consequently, furthermore, have two or more temperature sensors, in each case, formed by means of a temperature sensor arranged within the intermediate space, consequently during operation not contacted by the temperature sensor in the lumen of the at least one tube, which two or more temperature sensors are each coupled thermally conductively with the wall of one of the tubes and electrically with the measuring- and operating electronics. Such temperature sensors can be, for example, a platinum, measured resistance, a thermistor or a thermocouple or electrical circuits formed by means of a plurality of such temperature sensitive electrical, or electronic, components, for instance, in the form of a Wheatstone measuring bridge. Each of the at least two temperature sensors is adapted to convert a measuring point temperature corresponding to a temperature at a temperature measuring point formed by means of a particular temperature sensor, in each case, into a corresponding temperature measurement signal, namely an electrical measurement signal representing the particular measuring point temperature, for example, an electrical measurement signal having an electrical signal voltage dependent to the measuring point temperature and/or an electrical signal current dependent to the measuring point temperature. Furthermore, the measuring- and operating-electronics can additionally be adapted to generate measured values for the at least one measured variable using the at least two temperature measurement signals generated by means of the transducer apparatus.

As discussed, among others, in the above mentioned U.S. Pat. No. 4,768,384, WO-A 2013/092104, WO-A 2015/135738, or WO-A 2015/135739, a special problem in the ascertaining of the above discussed transducer apparatus temperature can be that the measuring point temperatures registered by means of the at least two, in given cases, even three or more temperature sensors correspond, firstly, in each case, actually to only a local temperature at exactly the temperature measuring point formed by means of the particular temperature sensor, that, however, conversely, most often actually a local, or average, temperature at another apparatus reference point, namely a temperature of a reference point within the transducer apparatus remote from each of the temperature measuring points, is more useful as transducer apparatus-, or target, temperature, for example, a spatially averaged tube temperature would better serve as target temperature. A further problem can additionally be that, as a result of unavoidable changes of the measured fluid temperature within the transducer apparatus as a function of time, regularly also dynamic heat equilibration processes can take place, which likewise, not least of all because of the only very limited number of temperature measuring points, or because of their mutual spatial separation, can lead to defective measurement results in measuring systems formed by means of transducer apparatuses of the type being discussed, not least of all also in the case of measured values for density and/or viscosity of the fluid to be measured, ascertained based on wanted oscillations of the at least one tube.

Further investigations on the part of the inventors have, furthermore, shown that, not least of all for the already established methods for computer based real time calculation of density, or viscosity, based on measurements of at least one of the resonance frequencies of the tubes, serving as the aforementioned transducer apparatus temperature basically that temperature is especially suitable, which corresponds to a temperature, which the wall of each of the tubes has assumed at its half-length, consequently, at the location of the oscillation exciter, in each case, for example, expressed as an average value of the two temperatures. Conversely, there results from this, however, in turn, the problem that, in each case, this concerns temperature of a region of the tubes, where the tubes during operation, because of the excited wanted oscillations, regularly have an extremely high, or maximum, oscillation amplitude, along with an equally very high, local acceleration. In corresponding manner, both the temperature sensors located there as well as also the electrical lines connected thereto would be exposed to very high acceleration forces, consequently increased mechanical loadings, and an increased risk of mechanical destruction. Additionally, it would be necessary for the purpose of registering only a single auxiliary measured variable also to run additional electrical lines in a region of the transducer apparatus, which typically needs to accommodate just the two lines for the exciter coil and no additional lines.

Taking this into consideration, an object of the invention is so to improve measuring systems of the aforementioned type that with even just two temperature sensors arranged outside the lumina of the at least two tubes, a transducer apparatus temperature can be ascertained, which compared with conventional measuring systems enables an improved metrological compensation of a dependence of the wanted frequency on a spatial temperature distribution within the transducer apparatus.

For achieving the object, the invention resides in a measuring system, for example, for measuring at least one measured variable of a fluid flowing in a pipeline, which measuring system comprises: a measuring- and operating-electronics, for example, one formed by means of a microprocessor and/or a digital signal processor, as well as a transducer apparatus electrically coupled with the measuring- and operating-electronics. The transducer apparatus of the invention includes:
- a first tube having a lumen surrounded by a wall and extending from an inlet side, first end to an outlet side, second end, for example, an at least sectionally bent and/or at least sectionally straight, first tube, which is adapted to be flowed through by a fluid, starting from the inlet side, first end and proceeding toward the outlet side, second end, and, during that, to be caused to vibrate,
- a second tube having a lumen surrounded by a wall and extending from an inlet side, first end to an outlet side, second end, for example, an at least sectionally bent and/or at least sectionally straight, second tube and/or a second tube constructed equally to the first tube and/or arranged parallel to the first tube, which second tube is adapted, for example, simultaneously with the first tube, to be flowed through by a fluid, starting from the inlet side, first end and proceeding toward the outlet side, second end, and, during that, for example, simultaneously with and/or opposite-equally to, the first tube, to be caused to vibrate,
- an electromechanical-exciter mechanism formed by means of at least one oscillation exciter for exciting and maintaining mechanical oscillations of both the first as well as also the second tube about associated static resting positions thereof,
- a sensor arrangement formed by means of at least a first oscillation sensor for registering mechanical oscillations of at least one of the tubes,
- a first temperature sensor coupled mechanically and thermally conductively with the wall of the first tube and positioned closer to the first end of the first tube than to the second end of the first tube and adapted to register a first measuring point temperature, namely a temperature of the wall of the first tube at a first temperature measuring point formed by means of the temperature sensor, and to convert such into a first temperature measurement signal, namely a first electrical measurement signal representing the first measuring point temperature, as well as
- a second temperature sensor coupled mechanically and thermally conductively with the wall of the second tube and positioned closer to the second end of the second tube than to the first end of the second tube and adapted to register a second measuring point temperature, namely a temperature of the wall of the second tube at a second temperature measuring point formed by means of the second temperature sensor and to convert such into a second temperature measurement signal, namely a second electrical measurement signal representing the second measuring point temperature.

The measuring- and operating electronics of the measuring system of the invention is, in turn, adapted, with application of both the first temperature measurement signal as well as also the second temperature measurement signal to generate a transducer temperature measured value, which represents a transducer apparatus temperature, which deviates both from the first measuring point temperature as well as also from the second measuring point temperature, in such a manner that a magnitude of the transducer temperature measured value is greater than a magnitude of the first measuring point temperature and less than a magnitude of the second measuring point temperature, for example, corresponds to an arithmetic average value of the first and second measuring point temperatures and/or a weighted average of the first and second measuring point temperatures.

Moreover, the invention also resides in the use of such a measuring system for measuring at least one physical, measured variable, especially density and/or viscosity and/or mass flow rate and/or volume flow rate, of a flowing fluid, especially one flowing in a pipeline, especially a gas, a liquid or a flowable dispersion.

In a first embodiment of the invention, it is provided that the first temperature sensor is positioned closer to the first end of the first tube than the second temperature sensor is to the first end of the second tube.

In a second embodiment of the invention, it is provided that the second temperature sensor is positioned closer to the second end of the second tube than the first temperature sensor is to the second end of the first tube.

In a third embodiment of the invention, it is provided that the first temperature sensor is positioned the same distance from the first end of the first tube as the second temperature sensor is from the second end of the second tube.

In a fourth embodiment of the invention, it is provided that the first temperature sensor is positioned the same distance from the second end of the first tube as the second temperature sensor is from the first end of the second tube.

In a fifth embodiment of the invention, it is provided that the first temperature sensor is positioned at the same distance from a halflength of the first tube as the second temperature sensor is from a halflength of the second tube.

In a sixth embodiment of the invention, it is provided that the first temperature sensor and the second temperature sensor are of equal construction.

In a seventh embodiment of the invention, it is provided that the first temperature sensor is coupled in the same manner thermally conductively with the wall of the first tube as the second temperature sensor is with the wall of the second tube, especially in such a manner that a thermal resistance opposing a heat flow flowing from the wall of the first tube to the first temperature sensor and further to an atmosphere surrounding the first temperature sensor is the same as a thermal resistance opposing a heat flow flowing from the wall of the second tube to the second temperature sensor and further to an atmosphere surrounding the second temperature sensor.

In an eighth embodiment of the invention, it is provided that the first temperature sensor is coupled mechanically with the wall of the first tube in the same manner as is the second temperature sensor with the wall of the second tube.

In a ninth embodiment of the invention, it is provided that the first tube is mirror symmetrically arranged about at least one imaginary symmetry axis imaginarily cutting the first tube, especially an imaginary symmetry axis coinciding with a principal axis of inertia of the first tube and the second tube is mirror symmetrically arranged about at least one imaginary symmetry axis imaginarily cutting the second tube, especially an imaginary symmetry axis coinciding with a principal axis of inertia of the second tube.

In a tenth embodiment of the invention, it is provided that a temperature sensor arrangement of the transducer apparatus formed by means of the first temperature sensor and by means of the second temperature sensor is axisymmetric about at least one imaginary symmetry axis imaginarily cutting the transducer apparatus, for example, an imaginary symmetry axis both parallel to a principal axis of inertia of the first tube as well as also parallel to a principal axis of inertia of the second tube.

In an eleventh embodiment of the invention, it is provided that both the first tube and also the second tube are bent, for example, V shaped- or U shaped.

In a twelfth embodiment of the invention, it is provided that both the first tube as well as also the second tube are, at least sectionally, for example, predominantly, straight, for example, circularly cylindrically straight.

In a thirteenth embodiment of the invention, it is provided that both the first tube as well as also the second tube are, at least sectionally, bent, for example, circular arc shaped.

In a fourteenth embodiment of the invention, it is provided that both the wall of the first tube as well as also the wall of the second tube are, at least partially, composed, for example, predominantly or completely, of a material, for example, a metal or an alloy, whose specific thermal conductivity is greater than 10 W/(m·K), and whose specific heat capacity is less than 1000 J/(kg·K).

In a fifteenth embodiment of the invention, it is provided that both the wall of the first tube as well as also the wall of the second tube are composed of a metal, or an alloy, for example, steel, titanium, zirconium, or tantalum.

In a sixteenth embodiment of the invention, it is provided that the first tube and the second tube are of equal construction.

In a seventeenth embodiment of the invention, it is provided that a straightened tube length of the first tube is greater than 300 mm and/or a straightened tube length of the second tube is greater than 300 mm.

In an eighteenth embodiment of the invention, it is provided that the first temperature sensor is formed by means of a first temperature registering unit, for example, a platinum measuring resistance, a thermistor or a thermocouple and by means of a first coupling body coupling the first temperature registering unit thermally conductively with the wall of the first tube, and that the second temperature sensor is formed by means of a second temperature registering unit, for example, a platinum measuring resistance, a thermistor or a thermocouple and by means of a coupling second body coupling the second temperature registering unit thermally conductively with the wall of the second tube.

In a nineteenth embodiment of the invention, it is provided that both the wall of the first tube as well as also the wall of the second tube have a wall thickness, which is greater than 0.5 mm and/or less than 10 mm.

In a twentieth embodiment of the invention, it is provided that both the first tube as well as also the second tube have an inner diameter, which is greater than 0.5 mm and/or less than 200 mm.

In a twenty-first embodiment of the invention, it is provided that both the first tube as well as also the second tube are so dimensioned that they have an inner diameter to wall thickness ratio, defined as a ratio of an inner diameter of the tube to a wall thickness of the tube, which is less than 25:1 and/or greater than 5:1.

In a twenty-second embodiment of the invention, it is provided that the first temperature sensor is connected with the outer surface of the wall of the first tube, especially by means of a heat conductive adhesive, such that the first coupling body is a bond, for example, an adhesive bond, and that the second temperature sensor is connected with the outer surface of the wall of the second tube, especially by means of a heat conductive adhesive, such that the second coupling body is a bond, for example, an adhesive bond.

In a twenty-third embodiment of the invention, it is provided that the transducer temperature measured value is an arithmetic average value of the first and second measuring point temperatures.

In a twenty-fourth embodiment of the invention, it is provided that the transducer temperature measured value is a weighted average of the first and second measuring point temperatures.

In a twenty-fifth embodiment of the invention, it is provided that the transducer temperature measured value represents an average tube wall temperature, namely a temperature corresponding to an arithmetic average value of an average tube wall temperature of the first tube and an average tube wall temperature of the second tube.

In a twenty-sixth embodiment of the invention, it is provided that the transducer apparatus, except for the first temperature sensor, has no additional temperature sensor contacting the wall of the first tube.

In a twenty-seventh embodiment of the invention, it is provided that the transducer apparatus, except for the second temperature sensor, has no additional temperature sensor contacting the wall of the second tube.

In a twenty-eighth embodiment of the invention, it is provided that the measuring- and operating electronics is adapted to generate an excitation signal driving the exciter mechanism, for example, its at least one oscillation exciter, for exciting mechanical oscillations of the tubes; and that the exciter mechanism is adapted, under influence of the excitation signal, to excite, and to maintain, mechanical oscillations of the tubes.

In a twenty-ninth embodiment of the invention, it is provided that the sensor arrangement of the transducer apparatus is adapted to deliver at least one oscillatory signal representing mechanical oscillations of at least one of the tubes. Developing this embodiment of the invention further, the measuring- and operating electronics is, additionally, adapted, with application of both the oscillation signal as well as also the first and second temperature measurement signals, to generate a measured value, which represents a measured variable, for example, a substance—or a flow, parameter, of a flowing fluid, e.g. a fluid flowing in a pipeline, e.g. a fluid in the form of a gas, a liquid or a flowable dispersion, for example, in such a manner that the measuring- and operating electronics, with application of the oscillation signal, generates a frequency measured value, which represents a frequency of mechanical oscillations of the first tube and/or of the second tube, or that the measuring- and operating electronics, with application of both the frequency measured value as well as also temperature measured value, generates a density measured value, namely measured value representing density of the fluid and/or a viscosity measured value, namely a measured value representing viscosity of the fluid.

In a thirtieth embodiment of the invention, it is provided that the sensor arrangement of the transducer apparatus is adapted to deliver at least a first oscillatory signal representing mechanical oscillations of at least one of the tubes as well as at least a second oscillatory signal representing mechanical oscillations of at least one of the tubes; this especially in such a manner that between the first oscillatory signal and the second oscillatory signal a phase difference exists dependent on the mass flow rate of a fluid flowing through the first tube and/or on the mass flow rate of a fluid flowing through the second tube. Developing this embodiment of the invention further, the measuring- and operating electronics is, additionally, adapted, with application of both the first oscillation signal as well as also the second oscillation signal, to generate a mass flow, measured value, namely a measured value representing a mass flow rate of a fluid flowing through the first tube and/or through the second tube.

In a thirty first embodiment of the invention, it is provided that the measuring- and operating electronics is adapted, with application of both the first temperature measurement signal as well as also the second temperature measurement signal, to generate a measured fluid temperature measured value, namely a measured value representing a temperature of a fluid flowing through the first tube and/or a temperature of a fluid flowing through the second tube.

In a thirty second embodiment of the invention, it is provided that the measuring- and operating electronics is adapted, with application of the first temperature measurement signal and not of the second temperature measurement signal, to generate an auxiliary temperature measured value, which at least approximately represents the transducer apparatus temperature.

In a thirty third embodiment of the invention, it is provided that the measuring- and operating electronics is adapted, with application of the second temperature measurement signal and not of the first temperature measurement signal, to generate an auxiliary temperature measured value, which at least approximately represents the transducer apparatus temperature.

In a thirty fourth embodiment of the invention, it is provided that the measuring- and operating electronics is, furthermore, adapted, with application of both the first temperature measurement signal as well as also the second temperature measurement signal, to generate a temperature deviation measured value, which represents an (absolute or relative) difference between the first measuring point temperature and the second measuring point temperature. Developing this embodiment of the invention further, the measuring- and operating electronics is, additionally, adapted, with application of the temperature deviation measured value, to monitor an ability of the transducer apparatus to function, for example, an ability of the first tube to function and/or an ability of the second tube to function, and/or the measuring- and operating electronics is adapted, with application of the temperature deviation measured value, to diagnose that the transducer apparatus has, compared with an original flow resistance, a changed flow resistance and/or the measuring- and operating electronics is adapted, with application of the temperature deviation measured value, to generate an alarm, which signals a degraded ability of the transducer apparatus to function, for example, as a result of a flow resistance of the first tube changed compared with an original flow resistance and/or as a result of a flow resistance of the second tube changed compared with an original flow resistance.

In a thirty fifth embodiment of the invention, it is provided that the measuring- and operating electronics has a multiplexer having at least two signal inputs as well as at least one signal output, which multiplexer is adapted, selectively, for example, cyclically, to connect one of its signal inputs to the signal output, in such a manner that a signal on the connected signal input is forwarded to the output, and it is provided that the measuring- and operating electronics has an analog to digital converter, for example, an analog to digital converter having a nominal resolution of greater than 16 bit and/or clocked with a sampling rate greater than 1000 $s^-$, with at least one signal input and at least one signal output, which analog to digital converter is adapted to convert an analog input signal applied on the signal input, using a sampling rate amounting, for example, to more than 1000 $s^-$, and using a digital resolution amounting, for example, to more than 16 bit, into a digital output signal representing the input signal and to provide such on the signal output. Developing this embodiment of the invention, it is, furthermore, provided that the at least one signal output of the multiplexer and the at least one signal input of the analog to digital converter are electrically coupled together and that the first temperature sensor and the second temperature sensor are electrically connected with the multiplexer in such a manner that the first temperature measurement signal is connected to a first signal input of the multiplexer and that the second temperature measurement signal is connected to a second signal input of the multiplexer, whereby the output signal of the analog to digital converter can at a given time represent exactly one of the two temperature measurement signals, such that the measuring- and operating electronics can generate the transducer temperature measured value with application of the output signal of the analog to digital converter representing, alternatingly, one of the two temperature measurement signals.

In a first further development of the invention, the measuring system further comprises a second oscillation sensor for registering, for example, outlet side, mechanical oscillations of at least one of the tubes, for example, an electrodynamic second oscillation sensor and/or one constructed equally to the first oscillation sensor.

In a first embodiment of the first further development of the invention, it is, additionally, provided that an oscillation sensor arrangement formed by means of the first oscillation sensor and by means of the second oscillation sensor is mirror symmetrically arranged about at least one imaginary symmetry axis imaginarily cutting the transducer apparatus, especially a symmetry axis parallel both to a principal axis of inertia of the first tube as well as also to a principal axis of inertia of the second tube.

In a second embodiment of the first further development of the invention, it is, additionally, provided that the first temperature sensor is positioned the same distance from the first oscillation sensor as the second temperature sensor is from the second oscillation sensor.

In a second further development of the invention, the measuring system further comprises an inlet side, first flow divider as well as an outlet side, second flow divider, wherein the first and second tubes are connected to the flow dividers, for example, equally constructed flow dividers, to form flow paths connected for flow in parallel, in such a manner that the first tube communicates with its first end with a first flow opening of the first flow divider and with its second end with a first flow opening of the second flow divider, and that the second tube communicates with its first end with a second flow opening of the first flow divider and with its second end with a second flow opening of the second flow divider.

In a third further development of the invention, the measuring system further comprises a transducer housing having a cavity surrounded by a wall, for example, a metal wall, wherein both the first as well as also the second tube are arranged within the cavity of the transducer housing, in such a manner that, between a cavity facing inner surface of the wall of the transducer housing, a cavity facing, outer surface of the wall of the first tube as well as a cavity facing, outer surface of the wall of the second tube, an intermediate space is formed, and wherein the transducer housing, the first tube and the second tube are adapted to hold in the intermediate space a fluid, especially a fluid having a specific thermal conductivity of less than 1 W/(m (K), for example, air or an inert gas, to form a fluid volume enveloping both the first as well as also the second tube, in such a manner that the intermediate space facing, outer surface of the wall of the first tube is contacted by fluid held in the intermediate space to form a first interface of first type, namely an interface between a fluid and a solid phase, and the intermediate space facing, outer surface of the wall of the second tube is contacted by fluid held in the intermediate space to form a second interface of first type.

In a fourth further development of the invention, the measuring system further comprises: a transducer housing having a cavity surrounded by a wall, for example, a metal wall, an inlet side, first flow divider as well as an outlet side, second flow divider,
wherein the first and second tubes are connected to the flow dividers, for example, equally constructed flow dividers, to form flow paths connected for flow in parallel, in such a manner that the first tube communicates with its first end with a first flow opening of the first flow divider and with its second end with a first flow opening of the second flow divider, and the second tube communicates with its first end with a second flow opening of the first flow divider and with its second end with a second flow opening of the second flow divider;
wherein both the first as well as also the second tube are arranged within the cavity of the transducer housing, in such a manner that between a cavity facing inner surface of the wall of the transducer housing, a cavity facing, outer surface of the wall of the first tube as well as a cavity facing, outer surface of the wall of the second tube an intermediate space is formed;
wherein the transducer housing, the first tube and the second tube are adapted to hold in the intermediate space a fluid, especially a fluid having a specific thermal conductivity of less than 1 W/(m (K), for example, air or an inert gas, to form a fluid volume enveloping both the first as well as also the second tube, in such a manner that the intermediate space facing outer surface of the wall of the first tube is contacted by fluid held in the intermediate space to form a first interface of first type, namely an interface between a fluid and a solid phase, and the intermediate space facing outer surface of the wall of the second tube is contacted by fluid held in the intermediate space to form a second interface of first type; and
wherein both the first flow divider as well as also the second flow divider are integral components of the transducer housing, especially in such a manner that a first end of the transducer housing is formed by means of the first flow divider and a second end of the transducer housing remote from the first end of the transducer housing is formed by means of the second flow divider.

In a fifth further development of the invention, the measuring system further comprises an inlet side, first connecting flange, especially an inlet side, first connecting flange serving for connecting the transducer apparatus to a line segment of a process line supplying the fluid, as well as an outlet side, second connecting flange, especially an outlet side, second connecting flange serving for connecting the transducer apparatus to a line segment of a process line removing the fluid.

In an embodiment of the fifth further development of the invention, it is, additionally, provided that each of the connecting flanges has a sealing surface for the fluid tight, leakage free connecting of the transducer apparatus with a corresponding line segment of a process line, and that a smallest separation between the sealing surfaces defines an installed length, $L_{MT}$, of the transducer apparatus, especially an installed length greater than 250 mm and/or less than 3000 mm, that, for example, a tube length to installed length ratio of the transducer apparatus, defined by a ratio of a straightened tube length of the first tube to installed length of the transducer apparatus, is greater than 1.2—especially greater than 1.4—.

A basic idea of the invention is, on the one hand, in the case of ascertaining measured values for physical, measured variables of a flowing fluid based on resonance frequencies of vibrating tubes, to use as transducer apparatus temperature, a temperature, which corresponds, at least approximately, or as exactly as possible, to a temperature, which the wall of each of the tubes has assumed at its halflength, consequently, at the location of the oscillation exciter, thus a temperature, which corresponds, for example, to an average value of the temperatures, and, on the other hand, to ascertain the aforementioned transducer apparatus temperature based on as few as possible—ideally only two— localized temperature measurements at regions of the walls of the tubes vibrating during operation of the measuring system as little as possible or only with very small amplitude.

An advantage of the invention is additionally that a diagnosis of the transducer apparatus is performable during operation of the measuring system, for example, as regards a degradation of at least one of the walls and/or as regards a plugging of one of the tubes, using an arrangement of the invention for the temperature sensors and using the same temperature measurement signals used for ascertaining the transducer apparatus temperature. A further advantage of the invention is that through the arrangement of the invention for the temperature sensors, supplementally, also a certain redundancy is provided for the temperature measurement, thus the ascertaining of the above discussed transducer temperature, in such a manner that for the case, in which exactly one of the two temperature sensors is defective, or is separated from the measuring- and operating electronics, based on the only one still present temperature measurement signal, the measuring- and operating electronics can still ascertain an (auxiliary-) measured value for transducer apparatus temperature and output such equivalently instead of the usual transducer temperature measured value, for example, along with an electronic maintenance report initiating a repair of the transducer apparatus.

Figure 2:
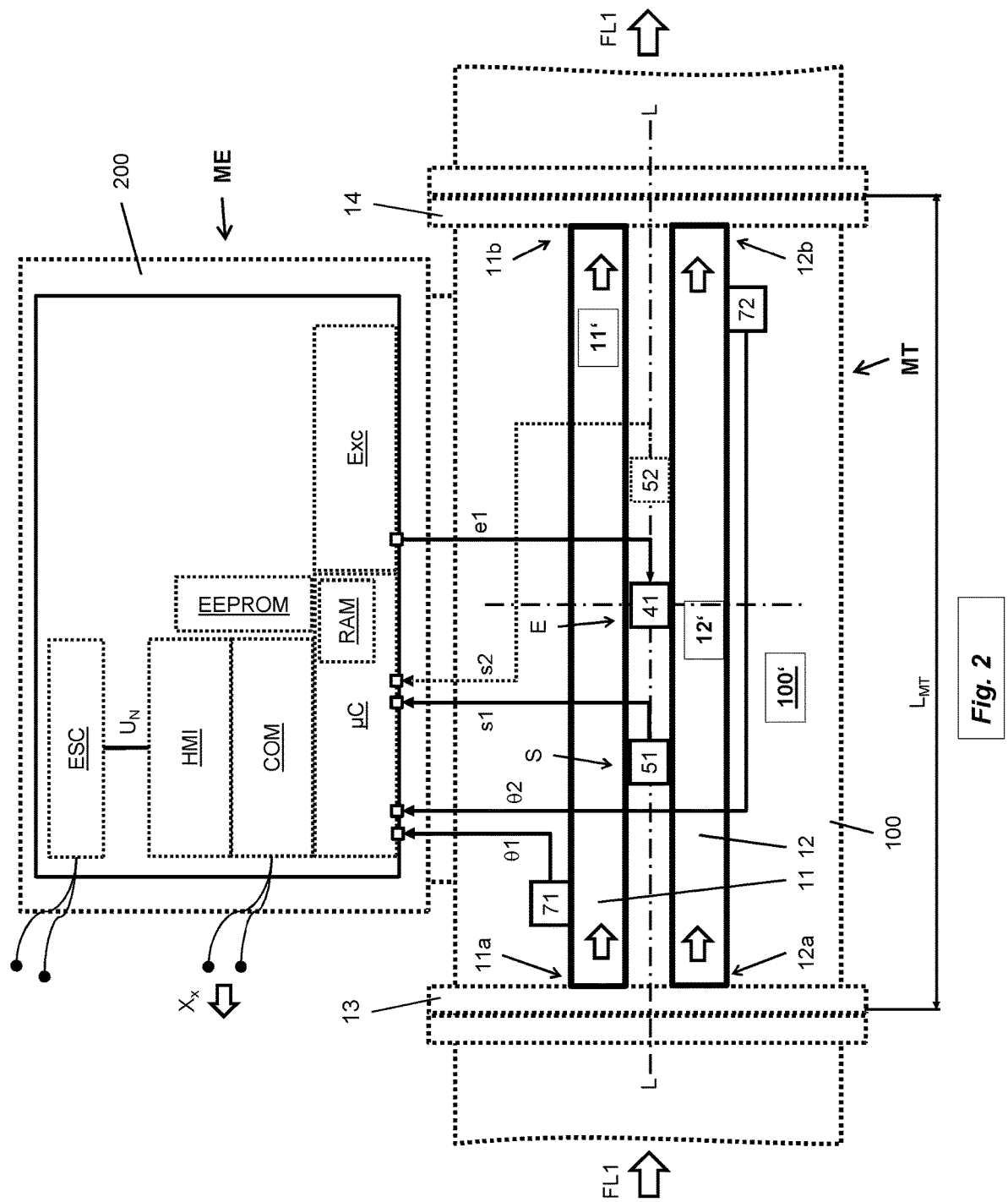
Figure 3B:
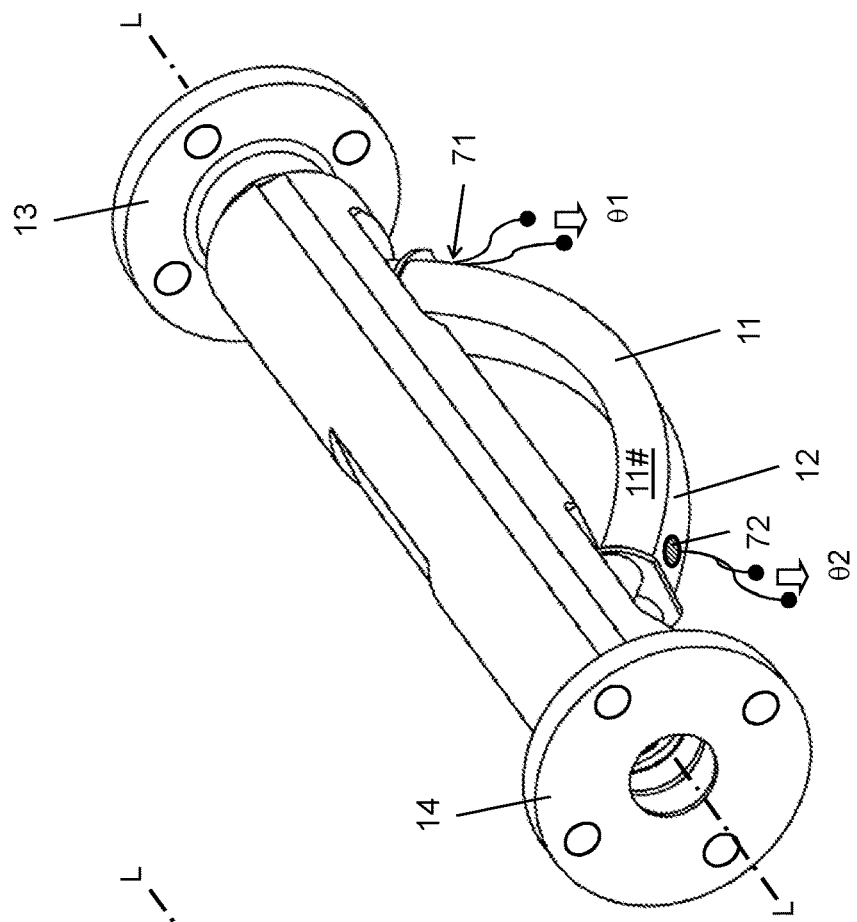
Figure 3A:
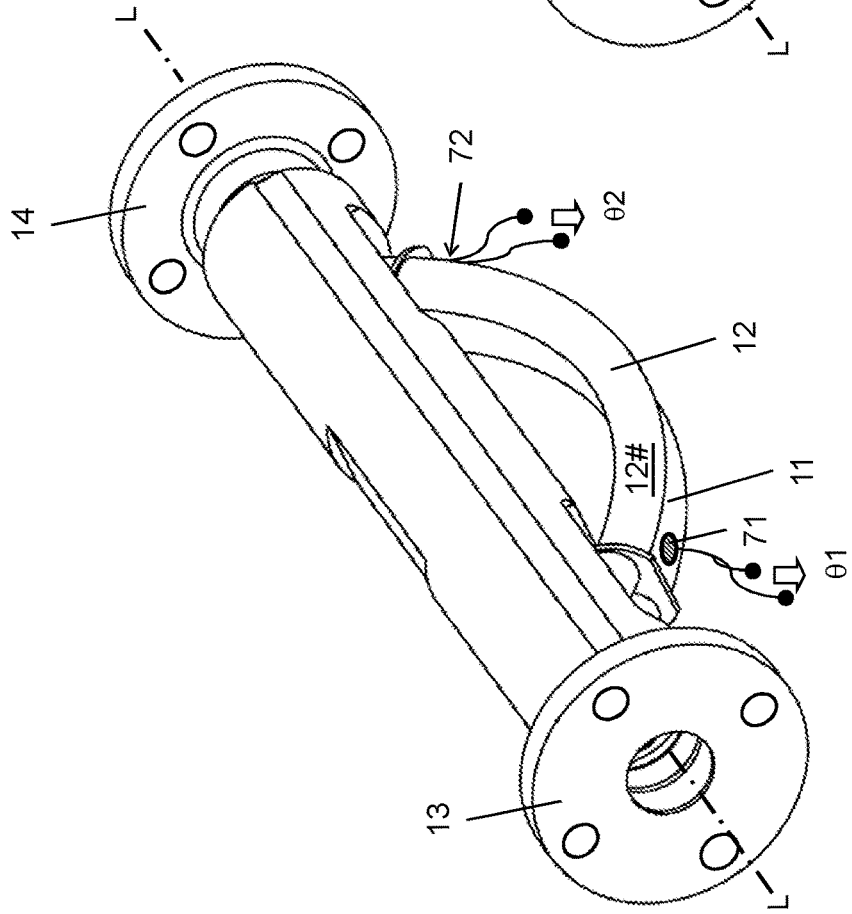
Figure 4:
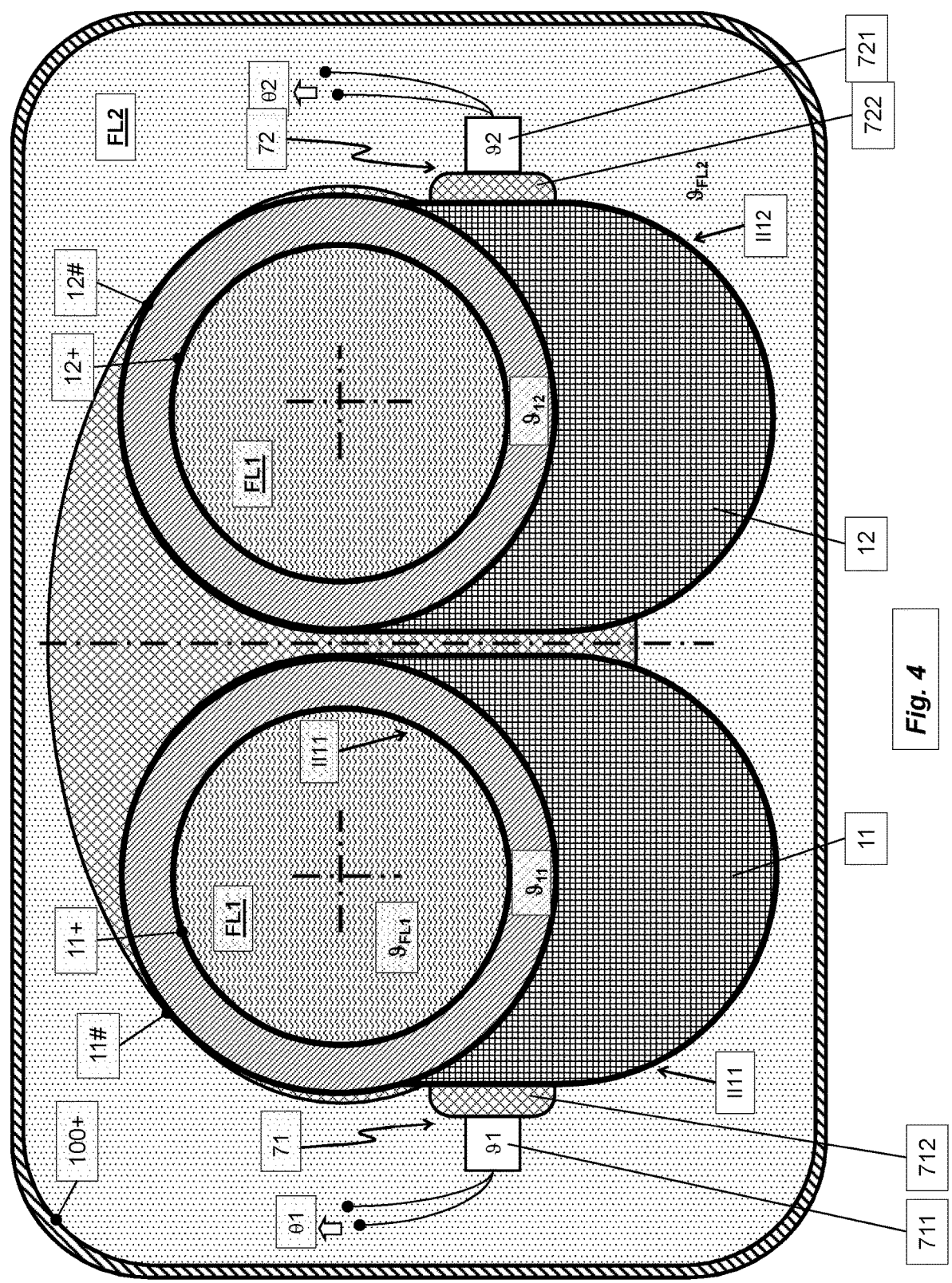
Figure 5B:
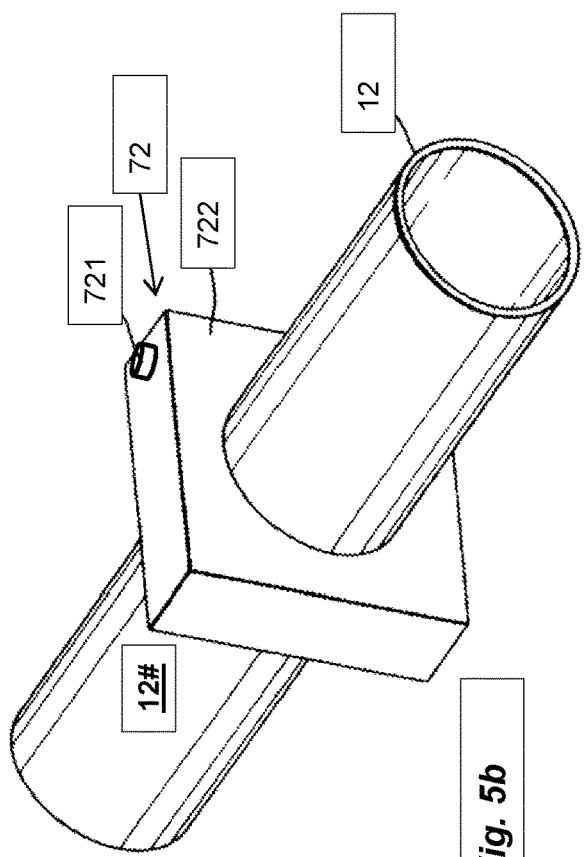
Figure 5A:
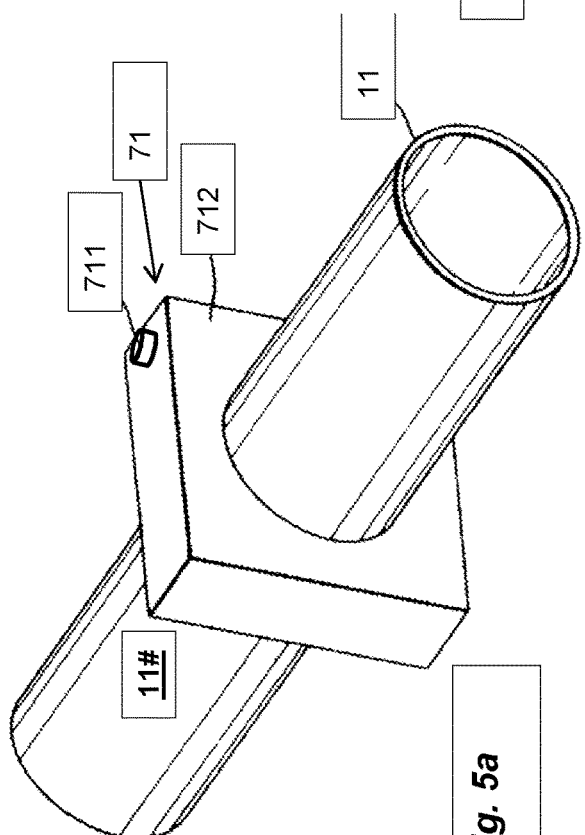
Figure 6:
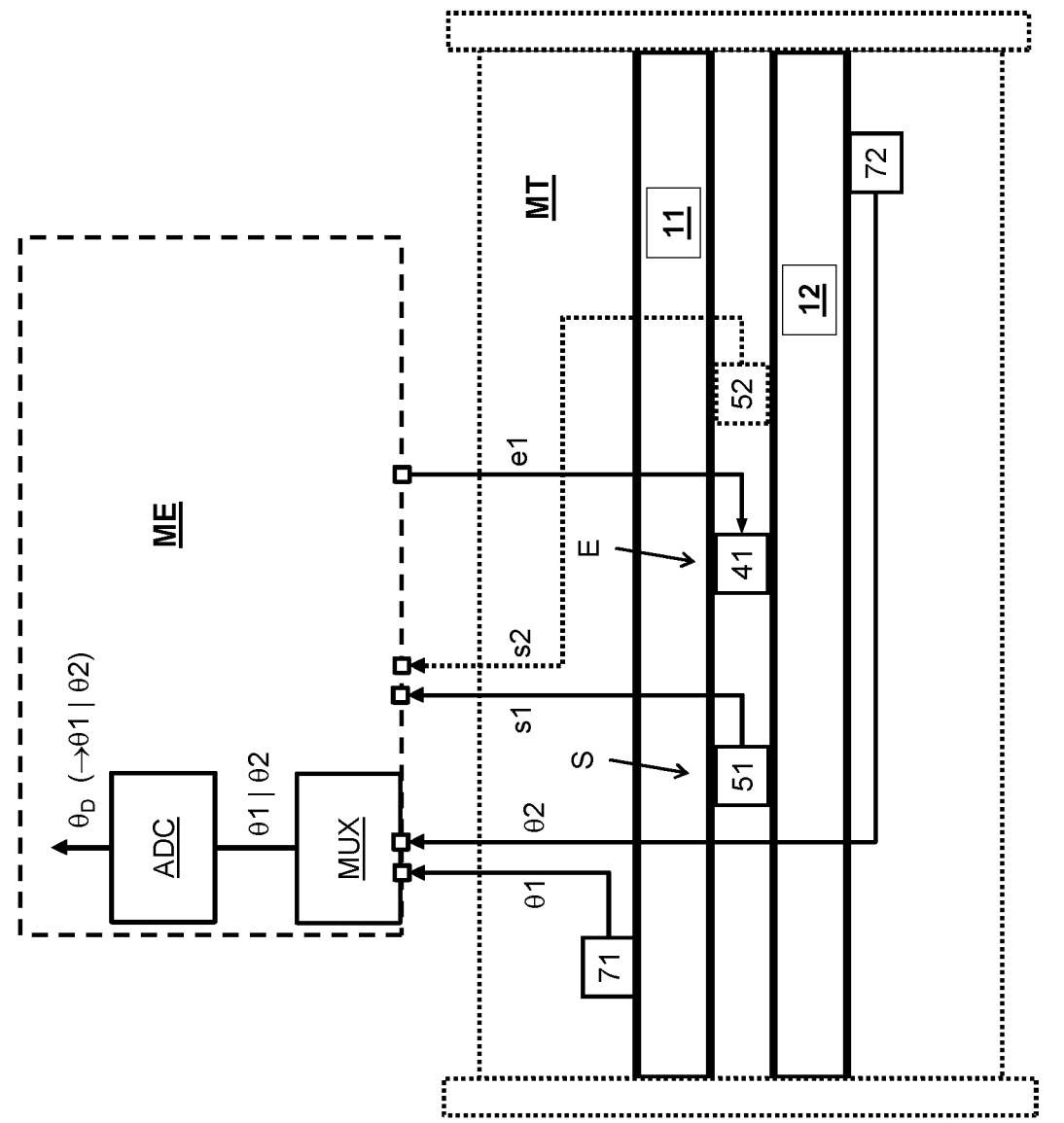
Figure 7:
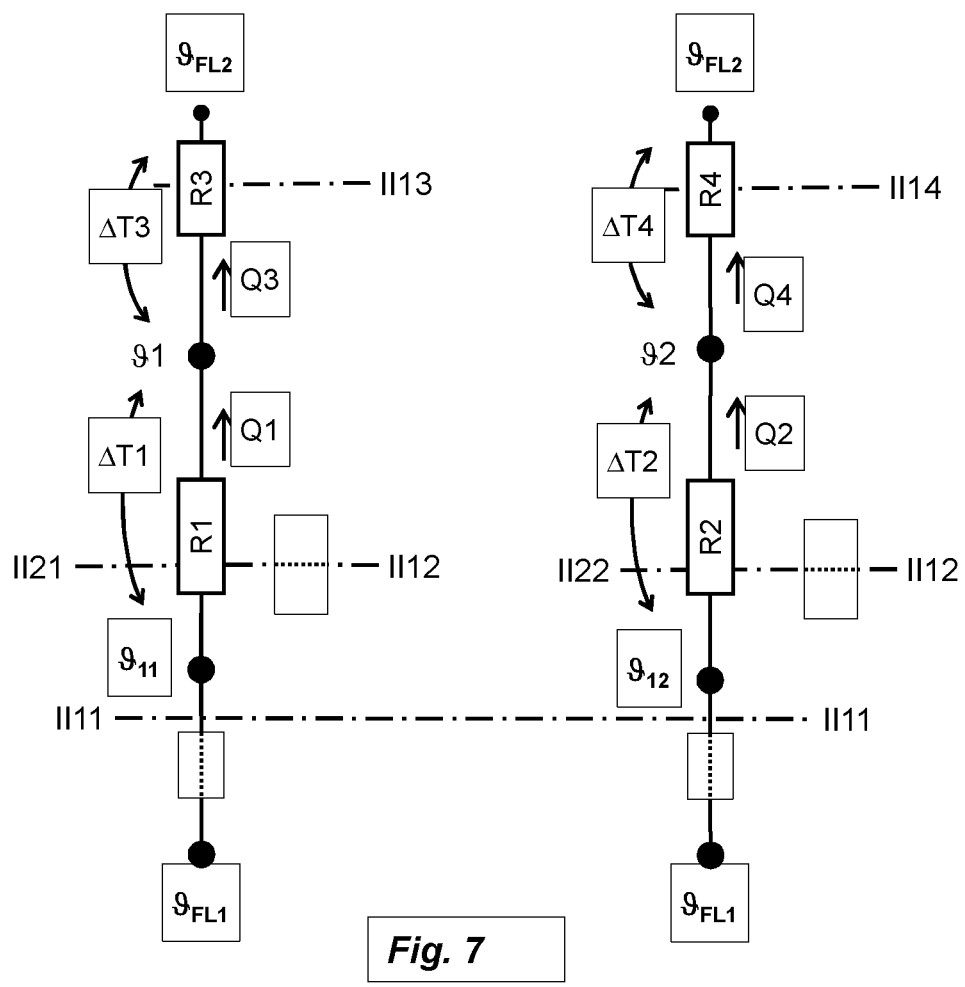

The invention as well as other advantageous embodiments thereof will now be explained in greater detail based on examples of embodiments, which are shown in the figures of the drawing. Equal parts are provided in all figures with equal reference characters; when perspicuity requires or it otherwise appears sensible, already mentioned reference characters are omitted in subsequent figures. Other advantageous embodiments or further developments, especially also combinations of, firstly, only individually explained aspects of the invention, result, furthermore, from the figures of the drawing, as well as also the dependent claims per se. The figures of the drawing show as follows:

FIG. 1 a measuring system, especially a measuring system suitable for application in industrial measuring- and automation technology, with a transducer apparatus having a transducer housing and a measuring- and operating electronics accommodated in an electronics housing—here directly secured on the transducer housing;

FIG. 2 schematically, an example of an embodiment for a measuring system of FIG. 1;

FIGS. 3a, 3b in perspective side views, a transducer apparatus suitable for a measuring system of FIG. 1, or 2;

FIG. 4 in a sectioned side view, a transducer apparatus suitable for a measuring system of FIG. 1, or 2;

FIG. 5a, 5b in different, sectioned, side views, other examples of embodiments for temperature sensors, especially temperature sensors suitable for a transducer apparatus of FIG. 3a, 3b, or a measuring system of FIG. 1;

FIG. 6 schematically, a further example of an embodiment for a measuring system of FIG. 1; and FIG. 7 a resistance network formed by means of a plurality of discrete thermal resistances in the manner of an equivalent circuit and serving for explaining heat flows flowing in a transducer apparatus of FIGS. 2, 3, or corresponding temperature gradients within the transducer apparatus.

Shown schematically in FIG. 1 is a measuring system for measuring at least one measured variable x, especially a substance—or flow parameter, of a flowing fluid FL1 (measured fluid)—, in given cases, having a time and/or spatially variable, measured fluid temperature $\vartheta_{FL1}$—, e.g. a fluid in the form of a gas, a liquid or a flowable dispersion, and for recurring ascertaining of measured values $X_x$ instantaneously representing the measured variable x. Measured variable x can be, for example, density ρ or viscosity η, consequently a measured variable, which has a certain dependence on measured fluid temperature $\vartheta_{FL1}$ and/or in the case of whose measuring a taking into consideration of various temperatures, or temperature distributions, within the measuring system can be required. The measured variable can be, furthermore, for example, also a mass flow rate m of the flowing fluid, for example, a fluid flowing through a pipeline, and/or its measured fluid temperature $\vartheta_{FL1}$.

The measuring system comprises a transducer apparatus MT for production of measurement signals dependent on the at least one measured variable as well as a measuring- and operating electronics ME electrically connected with the transducer apparatus MT, especially a measuring- and operating electronics ME supplied during operation with electrical energy from the outside via a connection cable and/or by means of an internal energy storer, for producing the measured values representing the measured variable(s) registered by means of the transducer apparatus, and, in given cases, for sequentially outputting such measured values, as currently valid measured values of the measuring system, on a corresponding measurement output, for example, also in the form of digital measured values and/or in real time.

The transducer apparatus of the measuring system serves, especially,—such as evident schematically in FIG. 2, or from a combination of FIGS. 1 and 2—during operation to guide a volume portion of the fluid FL1 to be measured, and to be flowed through by the fluid, as well as to provide different measurement signals for physical, measured variables to be registered by means of the transducer apparatus as well as for reigning measuring point temperatures at different measuring points within the transducer apparatus. The transducer apparatus is equipped for this purpose with a first tube 11 having a lumen 11' surrounded by a wall, for example, an at least sectionally bent and/or at least sectionally straight, first tube, as well as a second tube 12 having a lumen 11' surrounded by a wall, for example, an at least sectionally bent and/or at least sectionally straight, second tube. The tube 12 can—, such as shown in FIG. 2, 3a or 3b, or as a directly evident from the combination of such figures—, for example, be constructed equally to the first tube 11 and/or be arranged parallel to the first tube 11. The wall of the tube 11, and that of tube 12, can, such as usual in the case of transducer apparatuses of the type being discussed, be of metal, for example, be at least partially of titanium, zirconium or tantalum or, for example, also a stainless steel. Each of the tubes 11, 12 extends, such as shown in FIG. 2, from an inlet side, first end 11a, 12a to an outlet side, second end 11b, 12b and is, in each case, adapted to be flowed through by a fluid, starting from a particular inlet side, first end 11a, 12a and proceeding to the outlet side, second end 11b, 12b, and, during that, to be caused to vibrate, for example, also in such a manner that the tubes 11, 12 vibrate simultaneously and/or opposite-equally.

Furthermore, each of the—, for example, equally constructed—tubes 11, 12 of the transducer apparatus of the invention can be embodied at least sectionally straight, consequently sectionally (hollow-)cylindrical, for example, circularly cylindrical, and/or at least sectionally bent, for example, bent with a circular arc shape. Both the tube 11 as well as also the tube 12 can, furthermore, be mirror symmetric about at least one imaginary symmetry axis imaginarily cutting the particular tube, for example, a symmetry axis coinciding with a principal axis of inertia of the tube, and can be, for example, V shaped or U shaped. In an additional embodiment of the invention, it is, furthermore, provided that the wall of the tube 11 and/or the wall of the tube 12 is composed at least partially—, for example, also predominantly or completely—of a material, whose specific thermal conductivity $\lambda 10$ is greater than 10 W/(m·K) and whose specific heat capacity cp10 is less than 1000 J/(kg·K).

In an additional embodiment of the invention, it is provided that each of the tubes 11, 12 is able to execute wanted oscillations, namely mechanical oscillations about an associated static resting position, which are suitable to induce in the through flowing fluid Coriolis forces dependent on the mass flow rate m and/or frictional forces dependent on viscosity $\eta$ and/or inertial forces dependent on density $\rho$. The transducer apparatus can, accordingly, for example, be embodied as a measuring transducer of vibration-type, such as applied, among others, also in vibronic measuring systems formed as Coriolis mass flow measuring devices, as density measuring devices and/or as viscosity measuring devices, or serve as a component of such a measuring transducer.

As already indicated, the walls can be, for example, of a metal, or a metal alloy, for example, titanium, zirconium or tantalum, or a corresponding alloy thereof, a steel or a nickel based alloy. Furthermore, it is provided that the wall of each of the tubes 11, 12, in an additional embodiment of the invention, has, in each case, a wall thickness s, which is greater than 0.5 mm, and/or an inner diameter, which is greater than 0.5 mm. Alternatively or supplementally, each of the tubes can, furthermore, be so dimensioned that it has an inner diameter to wall thickness ratio D/s (defined as a ratio of an inner diameter D of a particular tube to a wall thickness s of the wall of the tube), which is less than 25:1. In an additional embodiment of the invention, it is, furthermore, provided that the wall thickness of each of the tubes is less than 10 mm and/or the inner diameter D is less than 200 mm, or that the each of the tubes 11, 12 is so dimensioned that the inner diameter to wall thickness ratio D/s is greater than 5:1.

The tubes 11, 12 can—such as quite usual in the case of transducer apparatuses of the type being discussed—be accommodated in a transducer housing 100 of the transducer apparatus, in such a manner that—, as well as also shown in FIG. 4, or directly evident from a combination of FIGS. 1, 2 and 4—each of the tubes 11, 12 is arranged within one and the same cavity of the transducer housing, enveloped by a wall of the transducer housing, for example, a metal wall and/or a wall serving as outer protective sleeve, and that between a cavity facing inner surface 100+ of the wall of the transducer housing 100, an outer surface 11 #of the wall of the tube 11, namely a cavity facing, outer surface of the wall of the tube 11, as well as an outer surface 12 #of the wall of the tube 12, namely a cavity facing, outer surface of the wall of the tube 12, an intermediate space 100' is formed. The tubes 11, 12 as well as the transducer housing are, in such case, also adapted to hold in the intermediate space 100' a fluid FL2, for example, air or an inert gas, for example, a fluid FL2 having a specific thermal conductivity of less than 1 W/(m (K), to form a fluid volume enveloping both the tube 11 as well as also the tube 12, in such a manner that the intermediate space facing, outer surface 11 #of the wall of the tube 11 is contacted by fluid FL2 held in the intermediate space 100' to form a first interface II11 of first type, namely an interface between a fluid and a solid phase, and the intermediate space facing, outer surface 12 #of the wall of the tube 12 is contacted by fluid FL2 held in the intermediate space 100' to form a second interface II12 of first type.

The at least two tubes 11, 12 can, for example, be connected fluid conductively together so as to form a serial flow path in such a manner that the tube 11 is connected with its second end 11b to the first end 12a of the tube 12. The tubes 11, 12 can, however, also—such as quite usual in the case of transducer apparatuses of the type being discussed—be connected fluid conductively together to form two paths for parallel flow. For such purpose, the transducer apparatus, in an additional embodiment of the invention, further comprises an inlet side, first flow divider $20_1$ as well as an outlet side, second flow divider $20_2$, wherein both the first tube 11 as well as also the second tube 12 are connected at the, for example, also equally constructed, flow dividers $20_1$, $20_2$ to form flow paths for parallel flow, in such a manner that the tube 11 with its end 11a communicates with a first flow opening $20_{1A}$ of the flow divider $20_1$ and with its end 11b communicates with a first flow opening $20_{2A}$ of the flow divider $20_2$, and that the tube 12 with its end 12a communicates with a second flow opening $20_{1B}$ of the flow divider $20_1$ and with its end 12b communicates with a second flow opening $20_{2B}$ of the flow divider $20_2$. For the above discussed case, in which the tubes 11, 12 are accommodated within a transducer housing 100, both the flow divider $20_1$ as well as also the flow divider $20_2$ can be integral components of the transducer housing, for instance, in such a manner that—, as well as also shown schematically in FIG. 2—the flow divider $20_1$ forms a first end of the transducer housing and the flow divider $20_2$ forms a second end of the transducer housing remote from the first end of the transducer housing.

As indicated in FIG. 2, the transducer apparatus MT can, furthermore, be adapted to be inserted into the course of a process line guiding the fluid, for example, a process line formed as a rigid pipeline, for example, to be connected releasably with the process line. For such purpose, there can be provided on the inlet end of the transducer apparatus a first connecting flange 13 serving for connecting the same to a line segment of the process line supplying the fluid FL1 and on the outlet end of the transducer apparatus a second connecting flange 14 serving for connection to a line segment of the process line removing the fluid. The connecting flanges 13, 14 can, in such case, such as quite usual in the case of transducer apparatuses of the type being discussed, or as indicated in FIG. 2, in given cases, even be integrated terminally into the aforementioned transducer housing 100, namely be embodied as integral components of the transducer housing. In an additional embodiment of the invention, it is, furthermore, provided that each of the connecting flanges 13, 14 has a sealing surface for the fluid-tight, leakage free connecting of the transducer apparatus with line segments of a process line and, additionally, that a smallest separation between the sealing surfaces defines an installed length $L_{MT}$ of the transducer apparatus; this, especially, in such a manner that the installed length $L_{MT}$ is greater than 250 mm and/or less than 3000 mm and/or in such a manner that a tube length to installed length ratio $L_{11}/L_{MT}$ of the transducer apparatus, defined by a ratio of a straightened tube length $L_{11}$ of the first tube 11 to the above discussed installed length $L_{MT}$ is greater than 1.2, for example, also greater than 1.4. The aforementioned straightened tube length $L_{11}$ (stretched length) of the tube 11 and/or a straightened tube length $L_{12}$ of the tube 12 can additionally be, for example, greater than 300 mm.

The measuring- and operating electronics ME, e.g. one formed by means of at least one microprocessor and/or by means of a digital signal processor (DSP), can, in turn, as shown in FIG. 2, for example, be accommodated in a single, in given cases, even chambered, electronics housing 200 of the measuring system. Electronics housing 200 can, depending on requirements for the measuring system, be embodied, for example, also impact- and/or also explosion-resistantly and/or hermetically sealedly. The measuring device electronics ME can, as well as also shown schematically in FIG. 2 in the manner of a block diagram, have a measuring- and evaluating circuit µC formed, for example, by means of a microprocessor, for processing measurement signals of the transducer apparatus MT. During operation, the measuring- and evaluating circuit µC generates corresponding measured values for the measured variable to be registered by means of the measuring system. The measuring- and evaluating circuit µC of the measuring- and operating electronics ME can, for example, be implemented by means of a microcomputer having at least one microprocessor and/or a digital signal processor (DSP). The program code to be performed thereby, as well as also operating parameters useful for control of a particular measuring system, e.g. desired values for controllers or control algorithms implemented by means of the measuring- and operating electronics, can—, as well as also schematically shown in FIG. 2—, be stored persistently e.g. in a non-volatile data memory EEPROM of the measuring- and operating electronics ME and in the case of startup of the same be loaded into a volatile data memory RAM, e.g. one integrated into the microcomputer. Microprocessors suitable for such applications, e.g. TMS320VC33, are available from the firm, Texas Instruments Inc.

The measured values $X_x$ generated by means of the measuring- and operating electronics ME can in the case of the measuring system shown here be displayed, for example, on-site, namely directly at the measuring point formed by means of the measuring system. For visualizing measured values produced by means of the measuring system and/or, in given cases, measuring device internally generated, system status reports, such as, for instance, an error report signaling increased measurement inaccuracy, or—uncertainty, or an alarm signaling a disturbance in the measuring system or at the measuring point formed by means of the measuring system, there can be provided at the site of the measuring system, as well as also shown in FIG. 2, for example, a display- and servicing element HMI communicating with the measuring- and operating electronics, in given cases, even a portable HMI, such as, for instance, an LCD-, OLED- or TFT-display located in the electronics housing 200 behind a window provided correspondingly therein as well as a corresponding input keyboard and/or touch screen. Advantageously, the, for example, also (re-) programmable—, or remotely parameterable, measuring- and operating electronics ME can additionally be so embodied that it can during operation of the measuring system exchange measuring- and/or other operating data, such as, for instance, current measured values, system diagnosis values, system status reports or, however, also setting values serving for control of the measuring system, with an electronic data processing system superordinated thereto, for example, a programmable logic controller (PLC), a personal computer (PC) and/or a work station, via a data transmission system, for example, a fieldbus system, such as, for instance, FOUNDATION FIELDBUS, PROFIBUS, and/or wirelessly per radio. Furthermore, the measuring- and operating electronics ME can be so embodied that it can be supplied power from an external energy supply, for example, also via the aforementioned fieldbus system. For such purpose, the measuring- and operating electronics ME can have, for example, an internal energy supply circuit ESC for providing internal supply voltages UN and fed during operation via the aforementioned fieldbus system from an external energy supply provided in the aforementioned data processing system. In such case, the measuring system can, for example, be embodied as a so-called four conductor device, wherein the internal energy supply circuit of the measuring device electronics ME can be connected with an external energy supply by means of a first pair of lines and the internal communication circuit of the measuring- and operating electronics ME can be connected with an external data processing circuit or an external data transmission system by means of a second pair of lines. The measuring- and operating electronics can, furthermore, however, also be so embodied that it is, such as shown, among others, also in the above mentioned US-A 2006/0161359, electrically connectable with the external electronic data processing system by means of a two-conductor connection, for example, one configured as a 4-20 mA electrical current loop, and thereby supplied with electrical energy as well as providing the route for measured value transmission to the data processing system, in given cases, even by applying the HART multi-drop system. For the typical case, in which the measuring system is intended to be coupled to a fieldbus—or other electronic communication system, the measuring- and operating electronics ME, for example, also one (re-)programmable on-site and/or via communication system, can additionally have a corresponding communication interface COM—, for example, a communication interface conforming to one of the relevant industry standards, such as, for instance, IEC 61158/IEC 61784,—for a data communication, e.g. for transmitting measuring- and/or operating data, such as measured values representing the relevant measured variable, to the above mentioned programmable logic controller (PLC) or to a superordinated process control system, and/or for receiving settings data for the measuring system. The electrical connecting of the transducer apparatus to the measuring- and operating electronics can occur by means of corresponding connecting lines, which extend from the electronics housing 200, for example, via electrical cable feedthrough, into the transducer housing 100 and at least sectionally also within the transducer housing 100. The connecting lines can, in such case, at least partially be embodied as at least sectionally line wires surrounded by electrical insulation, e.g. in the form of "twisted pair"-lines, flat ribbon cables and/or coaxial cables. Alternatively thereto or in supplementation thereof, the connecting lines can at least sectionally also be formed by means of conductive traces of a circuit board, for example, a flexible, or partially rigid and partially flexible, in given cases, even lacquered, circuit board; compare, for this, also the above mentioned US-A 2001/0037690 or WO-A 96/07081.

For exciting and maintaining mechanical oscillations of both the first as well as also the second tube 11, 12 about their static resting positions—especially mechanical oscillations of each of the tubes about imaginary first and second, oscillation axes imaginarily connecting first and second ends, thus, for instance, the above discussed wanted oscillations—, the transducer apparatus includes, furthermore, an electromechanical-exciter mechanism E formed by means of at least one, for example, electrodynamic, oscillation exciter 41. Furthermore, the transducer apparatus comprises a first oscillation sensor 51 formed by means of at least one sensor arrangement S, for example, an electrodynamic sensor arrangement and/or one of the same type as the oscillation exciter, and serving for registering mechanical oscillations, for example, inlet side and/or outlet side, mechanical oscillations, of at least one of the tubes 11, 12. Moreover, in an additional embodiment of the invention, the measuring- and operating electronics ME is adapted to generate an excitation signal (e) driving the exciter mechanism E, for example, its at least one oscillation exciter 41, for exciting mechanical oscillations of the tubes and the exciter mechanism E is adapted, under influence of the excitation signal e, to excite, and to maintain, mechanical oscillations of the at least two tubes 11, 12, for example, opposite-equal oscillations. In an additional embodiment of the invention, the sensor arrangement S of the transducer apparatus is further adapted to deliver at least one (first) oscillatory signal s1 representing mechanical oscillations of at least one of the tubes. Moreover, the measuring- and operating electronics ME is in an additional embodiment of the invention adapted, with application of the oscillation signal s1, recurringly to generate a frequency measured value $X_f$, which represents a frequency of mechanical oscillations of the tube 11 and/or of the tube 12; this, especially, in such a manner that, based on the oscillation signal a wanted frequency, namely an oscillation frequency of the wanted oscillations dependent on the measured variable to be measured, is ascertained and represents the frequency measured value $X_f$ of the wanted frequency. Selected as wanted frequency can be, such as quite usual in the case of vibronic measuring systems of the type being discussed, one of the resonance frequencies present in the tubes conveying the fluid, for example, a resonance frequency of a bending oscillation fundamental mode of the tubes. Moreover, the measuring- and operating electronics ME is adapted, in an additional embodiment of the invention, to generate, with application at least of the frequency measured value, at least one measured value $X_x$. The measured value $X_x$ generated by means of the frequency measured value $X_f$ can be, for example, a density measured value ($X_\rho \rightarrow X_x$) representing the density ρ of the fluid.

Particularly for the above-described case, in which the transducer apparatus, or the measuring system formed therewith, is provided to measure a mass flow rate m of the flowing fluid, the sensor arrangement S of the transducer apparatus can, furthermore, also be adapted to deliver at least a second oscillatory signal s2 representing mechanical oscillations of at least one of the tubes, especially in such a manner that between the oscillatory signal s1 and the oscillatory signal s2 a phase difference exists dependent on the mass flow rate of the fluid flowing through the tube 11 and/or through the tube 12. Accordingly, the measuring- and operating electronics ME is, in an additional embodiment of the invention, furthermore, also adapted, with application of both the oscillation signal s1 as well as also oscillation signal s2 to generate a mass flow, measured value $X_m$, namely a measured value ($X_x \rightarrow X_m$) representing a mass flow rate, m, of a fluid flowing through the tube 11 and/or through the tube 12. For such purpose,—, as well as also shown in FIG. 2—there can be provided in the measuring- and operating electronics ME, furthermore, a corresponding driver circuit Exc, namely one serving for activating the transducer apparatus MT, in given cases, also electrically connected with the above discussed measuring- and evaluating-circuit μC. The driver circuit Exc is adapted to provide at least one electrical driver signal e1 for an oscillation exciter present, in given cases, in the transducer apparatus. Moreover, the measuring- and operating electronics ME can for this also be so embodied that it corresponds, as regards circuit construction, to one of the measuring- and operating electronics known from the above mentioned state of the art, for example, U.S. Pat. No. 6,311,136, or, for example, also to a measurement transmitter of a Coriolis mass flow-/density measuring device available from the applicant, e.g. under the designation "PROMASS 83F". For the purpose of generating the above discussed oscillation signal s2, the transducer apparatus, or the measuring system formed therewith, further comprises a second oscillation sensor 52, for example, an electrodynamic, second oscillation sensor, or one constructed equally to the oscillation sensor 51, which is provided and adapted to register, for example, outlet side, mechanical oscillations of at least one of the tubes 11, 12. The oscillation sensor arrangement so formed by means of the two oscillation sensors 51, 52 can—such as quite usual in the case of transducer apparatus of the type being discussed—be, for example, also mirror symmetrically arranged about at least one imaginary symmetry axis imaginarily cutting the transducer apparatus, for example, about a symmetry axis parallel both to a principal axis of inertia of the tube 11 as well as also to a principal axis of inertia of the tube 12.

As already mentioned, in the case of transducer apparatuses of the type being discussed, or vibronic measuring systems formed therewith, an (auxiliary-) measured variable important for the operation, not least of all also for the precise ascertaining of the measured values for density or viscosity of the fluid, can, among others, also be a transducer apparatus temperature, which is suitable (as target temperature) to characterize a thermodynamic state of the transducer apparatus, or its influence on the oscillation characteristics of the transducer apparatus relevant for measuring the at least one substance—, or flow, parameter, for example, in order at least approximately to compensate metrologically by means of the measuring- and operating electronics ME a dependence of the wanted frequency on a spatially changing temperature distribution within the transducer apparatus and/or a temperature distribution changing as a function of time within the transducer apparatus—, for instance, for reasons of a temperature dependence of a modulus of elasticity of a particular material of the wall of the tube 11, or of the tube 12, or a temperature dependence of the particular spatial dimensions of the tubes. Furthermore, also the measured fluid temperature $\vartheta_{FL1}$ can be another target temperature regularly to be ascertained during operation of a particular measuring system.

For registering measuring point temperatures reigning within the transducer apparatus and for converting the same into a particular temperature measurement signal, the transducer apparatus of the invention further comprises—as shown in FIGS. 2, 3a, 3b, and 4—, a first temperature sensor 71 mechanically and thermally conductively coupled with the wall of the first tube as well as a second temperature sensor 72 mechanically and thermally conductively coupled with the wall of the second tube. The temperature sensors 71, 72 are additionally connected electrically with the measuring- and operating electronics ME, for example, in each case, by two of the above discussed electrical connecting lines. The temperature sensor 71 is, as well as also evident, in each case, in FIG. 2, and in FIG. 3a, positioned closer to the first end 11a of the tube 11 than to the second end 11b of the tube 11, while the temperature sensor 72, such as likewise evident from FIG. 2 and FIG. 3b, is positioned closer to the second end 12b of the tube 12 than to the first end 12a of the tube 12. Additionally, the temperature sensor 71 is provided and adapted to register a first measuring point temperature $\vartheta 1$, namely a temperature at a first temperature measuring point formed by means of the temperature sensor 71, and to convert such into a first temperature measurement signal θ1, namely a first electrical measurement signal representing the first measuring point temperature $\vartheta 1$, and the temperature sensor 72 is provided and adapted to register a second measuring point temperature $\vartheta 2$, namely a temperature at a second temperature measuring point formed by means of the temperature sensor 72 and to convert such into a second temperature measurement signal θ2, namely a second electrical measurement signal representing the second measuring point temperature $\vartheta 2$. Each of the temperature measurement signals θ1, θ2 can, for example, be so embodied that it has an electrical signal voltage dependent on a particular measuring point temperature $\vartheta 1$, $\vartheta 2$ and/or an electrical signal current dependent on the measuring point temperature.

In an additional embodiment of the invention, the temperature sensor 71 is positioned—, as well as also shown in FIG. 2—closer to the end 11a of the tube 11 than the temperature sensor 72 is to the end 12a of the tube 12, or, conversely, the temperature sensor 72 is positioned closer to the end 12b of the tube 12 than the temperature sensor 71 is to the end 11b of the tube 11; this, especially, in such a manner that the temperature sensor 71 is positioned the same distance from the end 11a of the tube 11 as the temperature sensor 72 is positioned from the end 12b of the tube 12 and/or that the temperature sensor 71 is the same distance from the end 11b of the tube 11 as the temperature sensor 72 is from the end 12a of the tube 12. Alternatively or supplementally, the temperature sensor 71 can, for example, also be positioned at the same distance from a halflength of the tube 11 as the temperature sensor 72 is from a halflength of the tube 12. Furthermore, the two temperature sensors 71, 72 can, additionally, also be so positioned that the temperature sensor 71 and the temperature sensor 72, as well as also indicated in FIG. 4, or directly evident from a combination of FIGS. 2 and 4, with reference to an imaginary longitudinal axis L of the transducer apparatus, for example, coinciding with a principal flow direction of the transducer apparatus, lie azimuthally—, for example, namely in projection on an imaginary cross sectional area having the longitudinal axis L as surface normal—diametrally opposite one another. Especially, the two temperature sensors 71, 72 can, furthermore, also be so positioned and arranged that a temperature sensor arrangement of the transducer apparatus formed by means of the temperature sensors 71, 72 is axisymmetric about at least one imaginary symmetry axis imaginarily cutting the transducer apparatus, for example, an imaginary symmetry axis parallel both to a principal axis of inertia of the tube 11 as well as also to a principal axis of inertia of the tube 12. For the above discussed case, in which the sensor arrangement S is formed by means of the above discussed, two oscillation sensors 51, 52, the temperature sensor 71—, as well as also shown in FIG. 2—, can, for example, be positioned the same distance from the oscillation sensor 51 as the second temperature sensor 72 is from the oscillation sensor 52.

In an additional embodiment of the invention, the temperature sensor 71 is coupled in the same manner thermally conductively with the wall of the tube 11 as the temperature sensor 72 is with the wall of the tube 12; this, for example, also in such a manner that a thermal resistance opposing a heat flow flowing from the wall of the tube 11 to the temperature sensor 71 and further to an atmosphere surrounding the temperature sensor 71 is the same as a thermal resistance opposing a heat flow flowing from the wall of the tube 12 to the temperature sensor 72 and further to an atmosphere surrounding the temperature sensor 72. Furthermore, it is provided that the temperature sensor 71 is coupled mechanically in the same manner with the wall of the tube 11 as the temperature sensor 72 is with the wall of the tube 12.

Temperature sensor 71 in an additional embodiment of the invention—, as well as also shown schematically in FIG. 2—is formed by means of a first temperature registering unit 711 arranged within the intermediate space 100' as well as by means of a first coupling body 712 coupling the temperature registering unit 711 thermally conductively with the wall of the tube 11. Analogously to this, the temperature sensor 72 can be formed by means of a second temperature registering unit 721 likewise arranged within the intermediate space 100'—, for example, also constructed equally to the temperature registering unit 711—as well as by means of a second coupling body 722—, for example, also one constructed equally to the coupling body 712—coupling the temperature registering unit 721 thermally conductively with the wall of the tube 12. Each of the two temperature registering units 711, 721—which perform the actual conversion of the (measuring point-)temperatures to be registered into the measurement signals—can be formed, for example, in each case, by means of a platinum measuring resistance, a thermistor or a thermocouple. Furthermore, each of the temperature registering unit 711, 721 can be connected with its associated coupling body 712, 722 by means of a suitable, material bonded connection, for example, an adhesive connection or a soldered, brazed or welded connection, and/or by embedding in the associated coupling body 712, 722.

For the purpose of achieving a mechanically solid and durable and thermally well conductive connection between the wall of the tube and the temperature sensor 71, in an additional embodiment of the invention, this is achieved by material bonding with the outer surface 11 #of the wall of the tube 11, for example, adhesively or by means of a soldered—, brazed or welded connection. Serving for manufacture of such a material bonded connection between tube 11 and temperature sensor 71 can be e.g. a heat conductive adhesive, thus a synthetic material based on epoxide resin or based on silicone, for example, a silicone elastomer or a 1- or 2 component, silicone rubber, such as, among others, also available from the firm, DELO Industrie Klebstoffe GmbH & Co KGaA, 86949 Windach, DE, under the designation, DELO-GUM® 3699. The synthetic material applied for connecting temperature sensor 71 and tube 11 together can additionally be mixed with metal oxide particles for the purpose of achieving an as good as possible heat conduction. Furthermore, it is additionally an option to manufacture the above discussed coupling body 712—partially or completely—of synthetic material (e.g. a plastic), for example, also in such a manner that a molded part serves as coupling body 712 placed between temperature registering unit 711 and wall, and contacting both the outer surface 11 #of the wall as well as also the temperature registering unit 711, in given cases, even a monolithic plastic part, i.e. the entire coupling body 712 is composed of synthetic material—, for example, applied one or multi-ply on the wall of the tube 11, thus placed between the wall of the tube 11 and the first temperature registering unit 711. Moreover, also the temperature sensor 72 can equally be connected by material bonding with the outer surface 12 #of the wall of the tube 12, for example, adhesively or by means of a soldered, brazed or welded connection. For such purpose, the coupling body 722 is composed in an additional embodiment of the invention at least partially, for example, also predominantly, of a metal, thus the coupling body 722 can be produced of a material, whose specific thermal conductivity λ2 is greater than 10 W/(m·K), and/or whose specific heat capacity cp722 is less than 1000 J/(kg·K), for example, the same material as the coupling body 712. Furthermore, the two above discussed coupling bodies 712, 722 can, by corresponding selecting of the materials actually utilized for their manufacture, in each case, be directly so embodied that the specific thermal conductivity λ722 of a material of the second coupling body 722 equals a specific thermal conductivity λ712 of a material of the coupling body 712 and/or the specific heat capacity cp722 of the material of the coupling body 722 equals a specific heat capacity cp712 of the material of the first coupling body 712.

In another embodiment of the invention, the second coupling body 722 of the temperature sensor 72 is produced at least partially of a synthetic material, or formed by means of a plastic body located correspondingly between the temperature sensor 721 and the wall of the tube 12. Alternatively thereto or in supplementation thereof, in an additional embodiment of the invention, both the coupling body 721 of the temperature sensor 71—, as well as also shown in FIG. 5a—is formed by means of a washer placed between the wall of the tube 11 and the temperature sensor 721 and composed of a metal, or a metal-alloy, for example, a steel, as well as also the coupling body 722 of the temperature sensor 72—, as well as also shown in FIG. 5b—is formed by means of such a washer placed between the wall of the tube 12 and the temperature sensor 721 and composed of a metal, or a metal-alloy, for example, a steel. Each of these two washers can be embodied as a washer having a passageway matched to the outer surface of the wall of a tube—, for example, an essentially annular or, as well as also shown in FIG. 5a, or 5b, in each case, an essentially rectangular washer—, which is pushed onto the tube, in such a manner that the washer grips around the tube 11, 12, or an inner surface of the passageway facing the outer surface of the wall of a tube at least partially contacts the outer surface 11 #, or 12 #. Each of these two washers can, for example, in each case, also serve both as coupling body 712, 722 of the temperature sensor 71, 72, or as a part of thereof, as well as also as a node plate forcing in—, or outlet side oscillation nodes of mechanical oscillations of the at least two tubes or, however, for example, also as securement of the oscillation sensor 51, or of the oscillation sensor 52 likewise present in given cases.

As shown schematically in FIG. 4, each of the two temperature sensors is thermally coupled to a tube. Thus, coupling body 712 of the temperature sensor 71 contacts the outer surface 11 #of the wall of the tube 11 to form a first interface II21 of second type, namely an interface between two solid phases, and coupling body 722 of the temperature sensor 72 contacts the outer surface 12 #of the wall of the tube 12 to form a second interface II22 of second type. Each of the two interfaces II21, II22 has a surface area resulting from the particular form of construction of the contacting coupling body 712, or 722, consequently a predetermined surface area. Accordingly, there acts—, as well as also shown in simplified manner in FIG. 7 based on an equivalent circuit for a resistance network formed by means of a plurality of discrete thermal resistances—against a heat flow Q1 resulting from a temperature difference ΔT1 reigning between the interface II21 of second type and the first temperature measuring point and flowing through the interface II21 and further to the first temperature measuring point a first thermal resistance R1 (R1=ΔT1/Q1) thermally conductively connected with the first temperature measuring point—here namely determined principally by heat conduction—, and there acts against a heat flow Q2 resulting from a temperature difference ΔT2 reigning between the interface II22 of second type and the second temperature measuring point and flowing through the interface II22 and further to the second temperature measuring point a second thermal resistance R2 (R2=ΔT2/Q2) thermally conductively connected with the second temperature measuring point—here a second thermal resistance likewise principally determined by heat conduction. In order to achieve an as good as possible thermal coupling of temperature sensor 71, as well as also temperature sensor 72, to the wall of the associated tube 11, 12, each of the thermal resistances R1 and R2, or each of the temperature sensors 71, 72, in an additional embodiment of the invention, is so dimensioned that each of the thermal resistances R1 and R2 is less than 1000 K/W, for example, less than 25 K/W. In an additional embodiment of the invention, the two thermal resistances R1, R2 are, furthermore, so dimensioned that R1=R2, namely that the two thermal resistances R1, R2 are sized equally large.

The measuring- and operating electronics ME of the measuring system of the invention is, furthermore, adapted, with application of both the temperature measurement signal θ1 as well as also temperature measurement signal θ2 (recurringly) to generate a transducer temperature measured value $X_\Theta$, which represents a transducer apparatus temperature $\vartheta_{MT}$, which differs both from the measuring point temperature $\vartheta 1$ as well as also from the measuring point temperature $\vartheta 2$, in such a manner that a magnitude of the transducer temperature measured value $X_\Theta$ is greater than a magnitude of the measuring point temperature $\vartheta 1$ and less than a magnitude of the measuring point temperature $\vartheta 2$; this, especially, in such a manner that the transducer temperature measured value $X_\Theta$ corresponds to a weighted average $$\frac{\alpha \cdot \vartheta 1 + \beta \cdot \vartheta 2}{\alpha + \beta}$$

of the measuring point temperatures $\vartheta 1$, $\vartheta 2$.

The calculation of the temperature measured value $X_\Theta$ can occur e.g. in such a manner that, firstly, based on the temperature measurement signal θ1 a first measuring point temperature measured value $X_1$ representing the measuring point temperature $\vartheta 1$ is generated as well as also based on the temperature measurement signal θ2 a second measuring point temperature measured value $X_2$ representing the measuring point temperature $\vartheta 2$ is generated, and that the transducer temperature measured value is ascertained according to a formula dependent on the measuring point temperature measured values $X_1$, $X_2$ as well as on earlier ascertained, numerical constants $\alpha$, $\beta$ stored in the measuring- and operating electronics ME:

$$X_\Theta = \alpha \cdot X_{\theta 1} + \beta \cdot X_{\theta 2}, \text{ or} \qquad (1)$$

$$X_\Theta = \frac{\alpha \cdot X_{\theta 1} + \beta \cdot X_{\theta 2}}{\alpha + \beta}. \qquad (2)$$

In the case of application of only two measuring point temperature measured values ascertained based on the temperature measurement signals, the constants $\alpha$, $\beta$ contained in these formulas can in advantageous manner also be selected such that they fulfill the condition $\alpha+\beta=1$; this, especially, also in such a manner that $\alpha=\beta=0.5$, such that the measuring point temperatures $\vartheta 1$, $\vartheta 2$ enter into the measurement result with equal weight, and the transducer temperature measured value $X_\Theta$ corresponds to an arithmetic average value $0.5(\vartheta 1 + \vartheta 2)$ of the measuring point temperatures $\vartheta 1$, $\vartheta 2$. For the mentioned case, in which both the two tubes 11, 12 are of equal construction and also the two temperature sensors 71, 72 are of equal construction and the construction of the temperature sensor arrangement of the transducer apparatus is axisymmetric compared with the above discussed imaginary symmetry axis, the transducer temperature, temperature measured value $X_\Theta$ accordingly is an arithmetic average value of a tube wall temperature at the halflength of the tube 11 and a tube wall temperature at the halflength of the tube 12 and/or a average tube wall temperature, which is at least approximately an arithmetic average value $0.5(\vartheta_{11}+\vartheta_{12})$ of an average tube wall temperature $\vartheta_{11}$ of the tube 11 and an average tube wall temperature $\vartheta_{12}$ of the tube 12. In case required, the constants $\alpha$, $\beta$ for this can, however, also be so defined by varying the above discussed condition $\alpha=\beta=0.5$—, for example, finely adjusted based on corresponding calibration measurements with the transducer apparatus—, in order that the transducer temperature measured value ultimately ascertained thereby at least actually corresponds more exactly to the average tube wall temperature than in the case of application of $\alpha=\beta=0.5$.

The measuring- and operating electronics ME in an additional embodiment of the invention is, furthermore, adapted to generate at least one measured value $X_x$—, for example, the above discussed density measured value $X_\rho$ and/or the above discussed mass flow, measured value $X_m$—with application of both the first temperature measurement signal $\theta 1$ generated by means of the transducer apparatus as well as also at least the second temperature measurement signal $\theta 2$ generated by means of the transducer apparatus. Especially, the measuring- and operating electronics ME is, namely, furthermore, adapted, with application of both the transducer temperature temperature measured value as well as also frequency measured value $X_f$, to generate a density measured value, namely a measured value representing density $\rho$ of the fluid and/or a viscosity measured value, namely a measured value representing viscosity $\rho$ of the fluid.

For the other case, in which the measuring system is furthermore, also provided to measure the measured fluid temperature $\vartheta_{FL1}$, the measuring- and operating electronics ME is, furthermore, adapted, based on the two temperature measurement signals $\theta 1$, $\theta 2$, in given cases, also to ascertain a measured fluid temperature measured value $X_{\Theta,FL}$, which represents the measured fluid temperature $\vartheta_{FL1}$. The measured fluid temperature measured value $X_{\Theta,FL}$ can be ascertained e.g. in very simple manner with application of a formula expanded compared with one of the above discussed formulas (1), (2) only by addition of a coefficient $K_{FL}$, for example, a fixedly specified coefficient $K_{FL}$.

$$X_{\Theta,FL} = \alpha \cdot X_{\theta 1} + \beta \cdot X_{\theta 2} + K_{FL} \qquad (3)$$

or $$X_{\Theta,FL} = \frac{\alpha \cdot X_{\theta 1} + \beta \cdot X_{\theta 2}}{\alpha + \beta} + K_{FL}, \qquad (4)$$

wherein the coefficient $K_{FL}$ represents a temperature-difference between the measured transducer apparatus temperature $\vartheta_{MT}$ and the contemporaneous measured fluid temperature $\vartheta_{FL1}$, especially a static, consequently earlier determinable, temperature-difference always occurring in the case of transducer apparatus located in thermal equilibrium.

As already discussed in the above mentioned US-A 2011/0113896, a special risk in the case of transducer apparatuses with parallel flow paths can be that one of the tubes forming the flow paths becomes partially or completely plugged in the course of operation, such that it has a flow resistance changed compared with an original flow resistance, while at least one other of the tubes remains largely intact and is still flowed through by fluid, such that it has a flow resistance differing from the above discussed flow resistance. The change of the flow resistance can result, for example, from a solid particle jammed in one of the tubes or from a deposit forming on the tube wall of one of the tubes. According to US-A 2011/0113896, WO-A 2009/134268, a diagnosis concerning such a degrading of the ability of the transducer apparatus to function can be performed, for example, based on measuring point temperatures, which are registered during operation of a particular transducer apparatus, or of the measuring system formed therewith, at different temperature measuring points established on the tubes. For example, a change of the flow resistance of one of the tubes can be detected based on a superelevated difference between such measuring point temperatures. Further investigations have surprisingly shown that such a detection can be reliably implemented using the above discussed temperature sensor arrangement. Accordingly, the measuring- and operating electronics ME in an additional embodiment of the invention is, furthermore, adapted, with application of both the temperature measurement signal $\theta 1$ as well as also temperature measurement signal $\theta 2$, to generate a temperature deviation measured value, which shows a difference, for example, an absolute or relative difference, between the measuring point temperature $\vartheta 1$ and the measuring point temperature $\vartheta 2$. Moreover, the measuring- and operating electronics ME is, furthermore, also adapted, with application of the temperature deviation measured value $X_{\Delta\Theta}$, to monitor an ability of the transducer apparatus to function, for example, an ability of tube 11 to function and/or an ability of tube 12 to function, and, in given cases, to diagnose that the transducer apparatus has a flow resistance changed compared with an original flow resistance, that thus at least one of the tubes of the transducer apparatus has a flow resistance changed compared with an original flow resistance and/or that the tube 11 has a flow resistance, which deviates from a flow resistance of the tube 12. For example, the measuring- and operating electronics ME can also be adapted, with application of the temperature deviation measured value $X_{\Delta\Theta}$, to generate an alarm, which signals a degraded ability of the transducer apparatus to function, for instance, as a result of the above discussed changes of the flow resistance.

In another embodiment of the invention, the measuring- and operating electronics ME is, furthermore, adapted, with application of the temperature measurement signal θ1 and not of the temperature measurement signal θ2, or with application of the temperature measurement signal θ2 and not of the temperature measurement signal θ1 to generate an auxiliary temperature measured value $X_{\Theta,MT}^*$, which at least approximately represents the transducer apparatus temperature. In this way, for example, also for the case, in which exactly one of the two temperature sensors 71, 72 is defective and/or separated from the measuring- and operating electronics ME, for instance, by a breaking of one of the above discussed connecting lines, in spite of this, a measured value for the transducer apparatus temperature can be ascertained and equivalently output instead of the transducer temperature measured value $X_{\Theta,MT}$. Moreover, the measuring- and operating electronics ME can, furthermore, also be adapted, with application of the temperature measurement signal θ1 and not of the temperature measurement signal θ2, or with application of the temperature measurement signal θ2 and not of the temperature measurement signal θ1, to generate an (additional) auxiliary temperature measured value $X_{\Theta,FL}^*$, which at least approximately represents the measured fluid temperature, as well as equivalently to output the auxiliary temperature measured value $X_{\Theta,FL}^*$, in given cases, instead of the measured fluid temperature measured value $X_{\Theta,FL}$. Alternatively or supplementally, the measuring- and operating electronics ME can additionally be adapted to detect the above discussed defective one of the temperature sensors 71, 72, or the above discussed separation of one of the temperature sensors 71, 72 from the measuring- and operating electronics ME and, in given cases, to announce such, for example, in the form of a maintenance report.

It has surprisingly, additionally, been found that, on the one hand, for calculating of both the measured value $X_x$, not least of all namely also for calculating one of the above discussed cases, that the measured value $X_x$ is density or viscosity of the fluid FL1, as well as also of the measured fluid temperature measured value, regularly just the two temperature measurement signals θ1, θ2 lead to sufficient measurement accuracy. On the other hand, however, also the aforementioned monitoring, or diagnosis, concerning the ability of the transducer apparatus to function can, for instance, also in contrast with the measuring systems shown in the above mentioned WO-A 2009/134268, deliver quite reliable results with the two temperature measurement signals θ1, θ2. Accordingly, for reducing costs for the transducer apparatus, as well as also for the measuring- and operating electronics ME, it is provided that the transducer apparatus MT, except for the temperature sensor 71, has no additional temperature sensor contacting the wall of the tube 11. Alternatively thereto or in supplementation thereof, it is, furthermore, provided that the transducer apparatus MT, except for the temperature sensor 72, has no additional temperature sensor contacting the wall of the tube 12.

For the purpose of reducing the effort for the electrical connection of the temperature sensors of the transducer apparatus with the measuring- and operating electronics ME, or for the purpose of enabling a simple wiring of the measuring- and operating electronics ME with the temperature sensors, the measuring- and operating electronics ME includes, as well as also shown in FIG. 6, in an additional embodiment of the invention, a multiplexer having at least two signal inputs as well as at least one signal output, as well as an analog to digital converter ADC having at least one signal input and at least one signal output, for example, an ADC having a nominal resolution of greater than 16 bit and/or clocked with a sampling rate greater than 1000 s⁻. The multiplexer MUX is especially adapted, selectively, for example, cyclically, to make one of its signal inputs conductive to the signal output, in such a manner that a signal applied to the connected signal input is forwarded to the signal output, while the analog to digital converter ADC is adapted to convert an analog input signal applied on the signal input with a sampling rate $f_S$, for example, a sampling rate greater than 1000 s⁻ and with a digital resolution N, for example, a digital resolution greater than 16 bit, into a digital output signal representing the input signal and to provide such on the signal output. As also shown in FIG. 6, the at least one signal output of the multiplexer and the at least one signal input of the analog to digital converter are electrically coupled together and the temperature sensor 71 and the temperature sensor 72 are electrically connected with the multiplexer MUX in such a manner that the temperature measurement signal θ1 goes to a first signal input of the multiplexer MUX and that the temperature measurement signal θ2 goes to a second signal input of the multiplexer MUX. As a result, the output signal of the analog to digital converter ADC during operation represents at given times exactly one of the two temperature measurement signals θ1, θ2. Furthermore, the measuring- and operating electronics ME can, additionally, be adapted to generate the transducer temperature measured value with application of the output signal of the analog to digital converter ADC representing, alternatingly, one of the two temperature measurement signals θ1, θ2.

In order to achieve that each of the temperature sensors 71, 72—, as well as also assumed in the case of the (static) calculational model underpinning the equivalent circuit diagram shown in FIG. 7—, in each case, has only a comparatively small, consequently negligible, thermal inertia, or that each of the two measuring point temperatures 81, 82, in each case, changes as quickly possible, thus, in each case, can follow a first tube wall temperature $\vartheta_{11}$, namely a local temperature assumed by the wall of the tube 11, or a second tube wall temperature $\vartheta_{12}$, namely a local temperature assumed by the wall of the tube 12, or that, conversely, that each of the two measuring point temperatures is not or, at most, to only a small degree, dependent on a change rate of a particular tube wall temperature $\vartheta_{11}$, $\vartheta_{12}$, namely a speed, with which the particular tube wall temperature changes as a function of time, in an additional embodiment of the invention, it is, furthermore, provided, so to construct each of the coupling bodies 712 and 722, in each case, that both the coupling body 712 as also the coupling body 722, as a result, in each case, has a heat capacity C1, or C2, which is less than 2000 J/K; this in advantageous manner, furthermore, such that the heat capacity C1 of the first coupling body 712 and the heat capacity C2 of the second coupling body 722 fulfill a condition $$\frac{1}{1000} < \frac{C1}{C2} \leq 1,$$

and/or that at least the coupling body 712 has a specific heat capacity, which is less than 200 J/(kg·K), as much as possible, however, also less than 100 J/(kg·K). Due to the typically compact construction desired for temperature sensors of the type being discussed as well as the typically used, namely thermally well conductive materials, there is, additionally, a close relationship between thermal resistance and heat capacity of a particular temperature sensor, in such a manner that the particular heat capacity—consequently also the aforementioned heat capacities C1 and C2—is smaller the smaller the particular thermal resistance is selected to be. Accordingly, by dimensioning the thermal resistances R1, R2 of the coupling bodies 712, 722 in the above discussed manner, it can at the same time also be achieved that each of the temperature sensors 71, 72, in each case, also has only a comparatively small thermal inertia relative to a particular tube wall temperature $\vartheta_{11}$, $\vartheta_{12}$, i.e. each of the two measuring point temperatures $\vartheta 1$, $\vartheta 2$ can—such as desired—, in each case, follow changes of a particular tube wall temperature as quickly possible, and, conversely, each of the two measuring point temperatures 41, 42 is not, or, at most, to only a small degree, dependent on a change rate of the tube wall temperature, namely a speed, with which the particular tube wall temperature changes as a function of time.

The intermediate space 100' formed between the inner surface 100+ of the wall of the transducer housing 100 and the outer surfaces 11 #, 12 # of the walls of the tube 11 and of the tube 12 is, furthermore,—such as quite usual in the case of transducer apparatuses of the type being discussed and as shown in FIG. 4 schematically by means of dotted crosshatching—filled with a fluid FL2, for example, a fluid FL2 having a specific thermal conductivity λF of less than 1 W/(m·K), for the purpose of forming a fluid volume surrounding the tubes 11, 12. The fluid FL2 held in the intermediate space 100', and the fluid volume formed therewith, has a fluid temperature henceforth referred to as the tube environment temperature $\vartheta_{FL2}$, which is, in given cases, even changeable as a function of time, which, at least at times, differs from the measured fluid temperature $\vartheta_{FL1}$ by more than 1 K (Kelvin), especially at least at times by more than 5 K. Accordingly, in an additional embodiment of the invention, the transducer housing and the tube are adapted to hold the fluid FL2 in the intermediate space 100', in such a manner that the outer surface 11 # of the wall of the tube 11 facing the intermediate space 100' contacts fluid FL2 stored in the intermediate space to form a second interface II12 of first type, such that the tube is thermally coupled to the fluid volume formed in the intermediate space 100'. Serving as fluid FL2 can be, for example, air or an inert gas, e.g. nitrogen or a noble gas, especially helium. As a result of this, also an outer surface of the temperature sensor 71 facing the intermediate space 100' is contacted by fluid FL2 held in the intermediate space to form a third interface II13 of first type (interface between a fluid and a solid phase) as well as an outer surface of the temperature sensor 72 equally facing the intermediate space 100' is contacted by fluid FL2 held in the intermediate space to form a fourth interface II14 of first type, and both the temperature sensor 71 as well as also the temperature sensor 72 are thermally coupled to the fluid volume formed in the intermediate space 100', in such a manner that there acts—, as well as also shown schematically in FIG. 4—against a heat flow Q3 resulting from a temperature difference ΔT3 reigning between the interface II13 of first type and the first temperature measuring point, namely flowing from the first temperature measuring point to interface II13 and passing through interface II13 a third thermal resistance R3 (R3=ΔT3/Q3) thermally conductively connected with the first temperature measuring point—here namely determined by heat conduction, as well as also by heat flow (convection) occurring at the interface II13—and against a heat flow Q4 resulting from a temperature difference ΔT4 reigning between the interface II14 of first type and the second temperature measuring point, namely flowing from the second temperature measuring point to interface II14 and passing through interface II14 a fourth thermal resistance R4 (R4=ΔT4/Q4) thermally conductively connected with the second temperature measuring point—here likewise determined by heat conduction as well as convection at the interface II14. Each of the thermal resistances R3 and R4 is in advantageous manner so dimensioned that it is less than 20000 K/W, especially less than 10000 K/W. In order to achieve as compared with the thermal coupling to the tubes 11, 12 weaker thermal coupling of the temperature sensor 71, or of the temperature sensor 72, to the fluid volume formed in the intermediate space 100', not least of all also in order to achieve that the therewith registered measuring point temperatures $\vartheta 1$, $\vartheta 2$ are as immune as possible against—, in given cases, even spatially differently occurring—at times, fast changes of the tube environment temperature $\vartheta_{FL2}$, or that the temperature sensors 71, 72 have, compared with the tube environment temperature $\vartheta_{FL2}$, as great as possible thermal inertias as compared with the tube wall temperatures $\vartheta_{11}$, $\vartheta_{12}$, the temperature sensor 71, and the temperature sensor 72, are in an additional embodiment of the invention, furthermore, so embodied that the thermal resistance R3, and the thermal resistance R4, are greater than 500 K/W, especially greater than 5000 K/W. In an additional embodiment of the invention, the two thermal resistances R3, R4 are, furthermore, so dimensioned that R3=R4, namely that the two thermal resistances R3, R4 are equally sized.

In order, on the one hand, to be able earlier to determine the thermal resistance R3 in as simple manner as possible, on the other hand, however, also to construct the thermal resistance R3 such that its particular examples within a lot, or series, of industrially manufactured transducer apparatuses of the type being discussed also have an as small as possible scatter from transducer apparatus to transducer apparatus, such that the transducer apparatus is, as a whole, well reproducible, the temperature sensor 71 can, furthermore, have a third coupling body coupling its temperature registering unit 711 thermally with the fluid volume formed in the intermediate space and contacting the fluid volume to form the third interface II13 of first type. The coupling body can at least partially, especially predominantly or completely, be of a material, whose specific thermal conductivity is greater than the specific thermal conductivity λF of the fluid FL2 held in the intermediate space and/or greater than 0.1 W/(m·K), and whose specific heat capacity is less than a specific heat capacity cpF of the fluid FL2 held in the intermediate space and/or less than 2000 J/(kg·K). Advantageously, the material of the above discussed coupling body can also be selected matched to the fluid FL2 held in the intermediate space such that a ratio of the specific thermal conductivity of the material to the thermal conductivity λF of the fluid FL2 held in the intermediate space is greater than 0.2, and/or that a ratio of the specific heat capacity of the material to the heat capacity cpF of the fluid FL2 held in the intermediate space is less than 1.5. The coupling body can be formed—, for example, also completely—by means of a synthetic material, e.g. an epoxide resin or a silicone, for example, also mixed with metal oxide particles, applied on the temperature registering unit 711 of the temperature sensor 71. Alternatively or supplementally, the coupling body can, in given cases, be formed, even completely, by means of a woven band applied on the temperature sensor 711, for example, a glass fiber woven band, or also by means of sheet metal, e.g. sheet metal strips of stainless steel, applied on the temperature registering unit 711. In equal manner, also the temperature sensor 72 can be formed by means of an additional, fourth coupling body, namely a fourth coupling body coupling its temperature registering unit 721 thermally with the fluid volume formed in the intermediate space and contacting the fluid volume formed in the intermediate space 100' to form the fourth interface II14 of first type. The coupling body can in advantageous manner additionally be embodied to be of equal construction to the coupling body of the temperature sensor 71 coupling the temperature registering unit 711 thermally to the fluid volume formed in the intermediate space 100'. In corresponding manner, also within the tube 11, namely on the inner surface 11+ of the wall of the tube facing its lumen, consequently contacted by fluid FL1 guided in the lumen, a fifth interface of first type is formed, as well as within the tube 12, namely on the inner surface 12+ of the wall of the tube 12 facing its lumen, consequently contacted by fluid FL1 guided in the lumen, a sixth interface of first type is formed, whereby, as a result, the tube wall temperature $\vartheta_{11}$ of the tube 11, and the tube wall temperature $\vartheta_{12}$ of the tube 12, are, in each case, determined by the measured fluid temperature $\vartheta_{FL1}$ of the fluid FL1 located instantaneously in the lumina of the tubes 11, 12.

Each of the above discussed thermal resistances R1, R2, R3 and R4 is defined—such as already mentioned—, in each case, decisively, or completely, by material parameters, e.g. specific thermal conductivity $\lambda$, as well as dimensions of the relevant coupling bodies, or tube walls, e.g. a length $L_{th}$ of a particular coupling body effective for the heat flow flowing through as well as a surface area $A_{th}$ of a particular cross sectional area of a particular coupling body effective for the heat flow, for example, the surface areas of the interfaces II21, II22, and/or by corresponding material parameters of the walls of the tubes 11, 12, or of the fluid FL2 in the intermediate space 100', consequently by parameters already at least approximately known and essentially unchanging over extended operational time frames. Thus, each of the thermal resistances R1, R2, R3, R4 can be earlier sufficiently exactly determined for the relevant parameters ($\lambda$, $A_{th}$, $L_{th}$), for example, by experimental measurements and/or by calculations. For example, namely based on the known relationship:

$$R_{th} = \frac{L_{eff}}{\lambda \cdot A_{eff}} \quad (5)$$

heat conduction resistances co-determining the thermal resistances R1, R2—namely resistances representing temperature gradients related to heat flow because of heat conduction processes—can be quantified, for example, calculated in units of K/W (Kelvin per watt). With knowledge of the material parameters of the materials utilized for manufacture of the temperature sensors, as well as the actual shapes and dimensions of the above-mentioned interfaces II13, II14, II21, II22 formed by means of the temperature sensors, also the resistance values for the previously mentioned heat transfer resistances co-determining the thermal resistances R1, R2, R3, R4 can, in each case, be sufficiently exactly fixed, or sufficiently exactly earlier ascertained.

Alternatively or supplementally, the thermal resistances R1, R2, R3, R4, or corresponding thermal resistance ratios can, for example, also be experimentally ascertained by means of calibration measurements performed on the transducer apparatus.

In order, on the one hand, to manufacture the temperature sensor 71 with as low as possible thermal inertia compared with changes as a function of time of the tube wall temperature of the tube 11, while, on the other hand, also achieving an as good as possible thermal coupling of the temperature sensor 71 to the wall of the tube also with as compact as possible construction, the coupling body 712 is, in an additional embodiment of the invention, at least partially —, for example, also predominantly or completely—made of a material, for example, a heat conductive adhesive, whose specific thermal conductivity 2712 is greater than a specific thermal conductivity $\lambda F$ of the fluid FL2 held in the intermediate space and/or greater than 1 W/(m·K). Advantageously, the material of the coupling body 712 is, in such case, furthermore, selected such that a ratio $\lambda 712/\lambda F$ of the specific thermal conductivity $\lambda 712$ of the material of the coupling body 712 to the specific thermal conductivity $\lambda F$ of the fluid FL2 held in the intermediate space is greater than 2, and/or that a ratio cp712/cpF of a specific heat capacity cp712 of the material of the coupling body 712 to the heat capacity cpF of the fluid FL2 held in the intermediate space is less than 1.5, especially in such a manner that the specific heat capacity cp712 is less than a specific heat capacity cpF of the fluid held in the intermediate space. Moreover, also the coupling body 722 of the temperature sensor 72 can be produced at least partially (or also completely) of the same material as the coupling body 712 of the temperature sensor 71, in order to provide an equally low thermal inertia of the temperature sensor 72 compared with changes as a function of time of the tube wall temperature of the tube 12 and achieve an equally good thermal coupling of the temperature sensor 72 to the wall of the tube 12. In an additional embodiment of the invention, it is, furthermore, provided that the first temperature sensor and the second temperature sensor are of equal construction, that namely both the temperature registering units and coupling bodies used therefor as well as also the thermal couplings of the above discussed components are essentially equal to one another, and relative to the associated tubes and to the fluid kept in the intermediate space.

The invention claimed is:

1. A measuring system, which measuring system comprises:
    a measuring- and operating electronics (ME), and
    a transducer apparatus electrically coupled with the measuring- and operating electronics,
    wherein the transducer apparatus includes:
        a first tube including a lumen surrounded by a wall and extending from an inlet side, first end to an outlet side, second end, which is adapted to be flowed through by a fluid, starting from the inlet side, first end and proceeding toward the outlet side, second end, and, during that, to be caused to vibrate,
        a second tube including a lumen surrounded by a wall and extending from an inlet side, first end to an outlet side, second end, which second tube is adapted to be flowed through by a fluid, starting from the inlet side, first end and proceeding toward the outlet side, second end, and, during that to be caused to vibrate,
        an electromechanical-exciter mechanism formed by means of at least one oscillation exciter for exciting and maintaining mechanical oscillations of both the first as well as also the second tube about associated static resting positions, a sensor arrangement formed by means of at least a first oscillation sensor for registering mechanical oscillations of at least one of the tubes (11, 12), a first temperature sensor coupled mechanically and thermally conductively with the wall of the first tube,
  which is positioned closer to the first end of the first tube than to the second end of the first tube, and
  which is adapted to register a first measuring point temperature, namely a temperature of the wall of the first tube at a first temperature measuring point formed by means of the temperature sensor, and to convert such into a first temperature measurement signal, namely a first electrical measurement signal representing the first measuring point temperature, and a second temperature sensor coupled mechanically and thermally conductively with the wall of the second tube,
  which is positioned closer to the second end of the second tube than to the first end of the second tube, and
  which is adapted to register a second measuring point temperature, namely a temperature of the wall of the second tube at a second temperature measuring point formed by means of the second temperature sensor and to convert such into a second temperature measurement signal, namely a second electrical measurement signal representing the second measuring point temperature;

wherein the transducer apparatus, except for the first temperature sensor, has no additional temperature sensor contacting the wall of the first tube and/or, except for the second temperature sensor, has no additional temperature sensor contacting the wall of the second tube; and wherein the measuring- and operating electronics is adapted, with application of both the first temperature measurement signal as well as also the second temperature measurement signal, to generate a transducer temperature measured value, which represents a transducer apparatus temperature, which deviates both from the first measuring point temperature as well as also from the second measuring point temperature, in such a manner that a magnitude of the transducer temperature measured value is greater than a magnitude of the first measuring point temperature and less than a magnitude of the second measuring point temperature.

2. The measuring system as claimed in claim 1,
wherein the first temperature sensor is positioned closer to the first end of the first tube than the second temperature sensor is to the first end of the second tube; and/or
wherein the second temperature sensor is positioned closer to the second end of the second tube than the first temperature sensor is to the second end of the first tube; and/or
wherein the first temperature sensor is positioned the same distance from the first end of the first tube as the second temperature sensor is from the second end of the second tube; and/or
wherein the first temperature sensor is positioned the same distance from the second end of the first tube as the second temperature sensor is from the first end of the second tube; and/or
wherein the first temperature sensor is positioned at the same distance from a halflength of the first tube as the second temperature sensor from a halflength of the second tube; and/or
wherein the first temperature sensor and the second temperature sensor are of equal construction; and/or
wherein the first temperature sensor is coupled in the same manner mechanically with the wall of the first tube as the second temperature sensor is with the wall of the second tube; and/or
wherein the transducer apparatus, except for the first temperature sensor, has no additional temperature sensor contacting the wall of the first tube.

3. The measuring system as claimed in claim 1, wherein the first temperature sensor is coupled in the same manner thermally conductively with the wall of the first tube as the second temperature sensor is with the wall of the second tube.

4. The measuring system as claimed in claim 1,
wherein the first tube is mirror symmetrically arranged about at least one imaginary symmetry axis imaginarily cutting the first tube; and/or
wherein a temperature sensor arrangement of the transducer apparatus formed by means of the first temperature sensor and by means of the second temperature sensor is axisymmetric about at least one imaginary symmetry axis imaginarily cutting the transducer apparatus.

5. The measuring system as claimed in claim 1, further comprising:
a second oscillation sensor for registering mechanical oscillations, especially outlet side, mechanical oscillations, of at least one of the tubes.

6. The measuring system as claimed in claim 5,
wherein an oscillation sensor arrangement formed by means of the first oscillation sensor and by means of the second oscillation sensor is mirror symmetrically arranged about at least one imaginary symmetry axis imaginarily cutting the transducer apparatus.

7. The measuring system as claimed in claim 1,
wherein both the first tube as well as also the second tube are bent; and/or
wherein both the first tube as well as also the second tube are, at least sectionally; and/or
wherein both the wall of the first tube as well as also the wall of the second tube are composed, at least partially, of a material whose specific thermal conductivity is greater than 10 W/(m·K), and whose specific heat capacity is less than 1000 J/(kg·K); and/or
wherein both the wall of the first tube as well as also the wall of the second tube are composed of a metal, or an alloy; and/or
wherein the first tube and the second tube are of equal construction.

8. The measuring system as claimed in claim 1, further comprising:
an inlet side, first flow divider as well as an outlet side, second flow divider, wherein the first and second tubes are connected to the flow dividers to form flow paths connected for flow in parallel, in such a manner that the first tube communicates with its first end with a first flow opening of the first flow divider and with its second end with a first flow opening of the second flow divider, and that the second tube communicates with its first end with a second flow opening of the first flow divider and with its second end with a second flow opening of the second flow divider.

9. The measuring system as claimed in claim 8, wherein both the first flow divider as well as also the second flow divider are integral components of the transducer housing.

10. The measuring system as claimed in claim 1, further comprising: a transducer housing including a cavity surrounded by a wall,
wherein both the first as well as also the second tube are arranged within the cavity of the transducer housing, in such a manner that, between a cavity facing inner surface of the wall of the transducer housing, a cavity facing, outer surface of the wall of the first tube as well as a cavity facing, outer surface of the wall of the second tube, an intermediate space is formed, and
wherein the transducer housing, the first tube and the second tube are adapted to hold in the intermediate space a fluid to form a fluid volume enveloping both the first as well as also the second tube, in such a manner that the intermediate space facing, outer surface of the wall of the first tube is contacted by fluid held in the intermediate space to form a first interface of first type, namely an interface between a fluid and a solid phase, and the intermediate space facing, outer surface of the wall of the second tube is contacted by fluid held in the intermediate space to form a second interface of first type.

11. The measuring system as claimed in claim 10,
wherein the fluid volume surrounding the first and second tubes contacts the first temperature sensor to form a third interface of first type as well as the second temperature sensor to form a fourth interface of first type, in such a manner that
a third thermal resistance opposes a heat flow resulting from a temperature difference reigning between the third interface of first type and the first temperature measuring point and flowing from the first temperature measuring point to the interface and passing through the interface, and
a fourth thermal resistance opposes a heat flow resulting from a temperature difference reigning between the fourth interface of first type and the second temperature measuring point and flowing from the second temperature measuring point to the interface and passing through the interface.

12. The measuring system as claimed in claim 11,
wherein the third thermal resistance and the fourth thermal resistance are, in each case, greater than 500 K/W, and/or less than 20000 K/W; and/or
and wherein the third thermal resistance and the fourth thermal resistance are so dimensioned that the third thermal resistance equals the fourth thermal resistance.

13. The measuring system as claimed in claim 1, further comprising:
an inlet side, first connecting flange, as well as
an outlet side, second connecting flange (14).

14. The measuring system as claimed in claim 13,
wherein each of the connecting flanges includes a sealing surface for the fluid tight, leakage free connecting of the transducer apparatus with a corresponding line segment of a process line,
and wherein a smallest separation between the sealing surfaces defines an installed length of the transducer apparatus.

15. The measuring system as claimed in claim 14, wherein a tube length to installed length ratio of the transducer apparatus, defined by a ratio of a straightened tube length of the first tube to installed length of the transducer apparatus, is greater than 1.2.

16. The measuring system as claimed in claim 1, wherein a straightened tube length of the first tube is greater than 300 mm and/or a straightened tube length of the second tube is greater than 300 mm.

17. The measuring system as claimed in claim 1,
wherein the first temperature sensor is formed by means of a first temperature registering unit and by means of a first coupling body coupling the first temperature registering unit thermally conductively with the wall of the first tube, and
wherein the second temperature sensor is formed by means of a second registering unit as well as by means of a second coupling body coupling the second temperature sensor thermally conductively with the wall of the second tube.

18. The measuring system as claimed in claim 17,
wherein the first temperature sensor and the second temperature sensor are of equal construction; and/or
wherein the first coupling body and the second coupling body are of equal construction.

19. The measuring system as claimed in claim 17,
wherein the first temperature sensor contacts the outer surface of the wall of the first tube by means of the first coupling body to form a first interface of second type, namely an interface between two solid phases, and the second temperature sensor contacts the outer surface of the wall of the second tube by means of the second coupling body to form a second interface of second type, in such a manner that
a first thermal resistance opposes a heat flow resulting from a temperature difference reigning between the first interface of second type and the first temperature measuring point and flowing through the interface and further to the first temperature measuring point, and
a second thermal resistance opposes a heat flow resulting from a temperature difference reigning between the second interface of second type and the second temperature measuring point and flowing through the interface and further to the second temperature measuring point;
and wherein the first thermal resistance and the second thermal resistance are so dimensioned that R1=R2 the first thermal resistance equals the second thermal resistance.

20. The measuring system as claimed in claim 19, wherein the first thermal resistance and the second thermal resistance are each less than 100 K/W.

21. The measuring system as claimed in claim 17, wherein the first coupling body is composed at least partially of a material, especially a heat conductive adhesive, whose specific thermal conductivity is greater than a specific thermal conductivity of the fluid held in the intermediate space and/or greater than 1 W/(m·K), and whose specific heat capacity is less than a specific heat capacity of the fluid held in the intermediate space and/or less than 2000 J/(kg·K).

22. The measuring system as claimed in claim 17,
wherein the first coupling body is formed by means of a synthetic material placed between the wall of the first tube and the first temperature registering unit,
and the second coupling body is formed by means of a synthetic material.

23. The measuring system as claimed in claim 1,
wherein both the wall of the first tube as well as also the wall of the second tube show, in each case, a wall thickness, which is greater than 0.5 mm and/or less than 10 mm; and/or wherein both the first tube as well as also the second tube have, in each case, an inner diameter which is greater than 0.5 mm and/or less than 200 mm; and/or wherein both the first tube as well as also the second tube are, in each case, so dimensioned that they have an inner diameter to wall thickness ratio defined as a ratio an inner diameter of the tube to a wall thickness of the wall of the tube, which is less than 25:1 and/or greater than 5:1; and/or wherein the first temperature sensor is connected by material bonding with the outer surface of the wall of the first tube in order to form the first coupling body, and wherein the second temperature sensor is connected by material bonding with the outer surface (12 #) of the wall of the second tube in order to form the second coupling body.

24. The measuring system as claimed in claim 1,
wherein the transducer temperature measured value is an arithmetic average value of the first and second measuring point temperatures and/or a weighted average of the first and second measuring point temperatures; and/or wherein the transducer temperature measured value represents an average tube wall temperature, namely a temperature corresponding to an arithmetic average value of an average tube wall temperature of the first tube and an average tube wall temperature of the second tube.

25. The measuring system as claimed in claim 1,
wherein the measuring- and operating electronics is adapted to generate an excitation signal driving the exciter mechanism for exciting mechanical oscillations of the tubes; and wherein the exciter mechanism is adapted, under influence of the excitation signal, to excite, and to maintain, mechanical oscillations of the tubes.

26. The measuring system as claimed in claim 1, wherein the sensor arrangement of the transducer apparatus is adapted to deliver at least one (first) oscillatory signal representing mechanical oscillations of at least one of the tubes.

27. The measuring system as claimed in claim 26, wherein the measuring- and operating electronics is adapted, with application of both the oscillation signal as well as also the first and second temperature measurement signals, to generate a measured value, which represents a measured variable of a flowing fluid.

28. The measuring system as claimed in claim 26, wherein the measuring- and operating electronics is adapted, with application of the oscillation signal, to generate a frequency measured value, which represents a frequency of mechanical oscillations of the first tube and/or of the second tube.

29. The measuring system as claimed in claim 28, wherein the measuring- and operating electronics is adapted with application of both the frequency measured value as well as also the temperature measured value to generate a density measured value, namely a measured value representing density of the fluid and/or a viscosity measured value, namely a measured value representing viscosity of the fluid.

30. The measuring system as claimed in claim 26, wherein the sensor arrangement of the transducer apparatus is adapted to deliver at least a second oscillatory signal representing mechanical oscillations of at least one of the tubes.

31. The measuring system as claimed in claim 30, wherein the measuring- and operating electronics is adapted, with application of both the first oscillation signal as well as also the second oscillation signal, to generate a mass flow, measured value, namely a measured value representing a mass flow rate of a fluid flowing through the first tube and/or through the second tube.

32. The measuring system as claimed in claim 1, wherein the measuring- and operating electronics is, furthermore, adapted, with application of both the first temperature measurement signal as well as also the second temperature measurement signal, to generate a temperature deviation measured value, which represents a difference, especially an absolute or relative difference, between the first measuring point temperature and the second measuring point temperature.

33. The measuring system as claimed in claim 32,
wherein the measuring- and operating electronics is adapted, with application of the temperature deviation measured value, to monitor an ability of the transducer apparatus to function.

34. The measuring system as claimed in claim 1,
wherein the measuring- and operating electronics includes a multiplexer including at least two signal inputs as well as at least one signal output, which multiplexer is adapted selectively to connect one of its signal inputs to the signal output, in such a manner that a signal on the connected signal input is forwarded to the signal output; and the measuring- and operating electronics includes an analog to digital converter with at least one signal input and at least one signal output, which analog to digital converter is adapted to convert an analog input signal applied on the signal input, using a sampling rate into a digital output signal representing the input signal and to provide such to the signal output.

35. The measuring system as claimed in claim 34,
wherein the at least one signal output of the multiplexer and the at least one signal input of the analog to digital converter are electrically coupled together; and wherein the first temperature sensor and the second temperature sensor are electrically connected with the multiplexer in such a manner that the first temperature measurement signal is connected to a first signal input of the multiplexer and the second temperature measurement signal is connected to a second signal input of the multiplexer.

36. The measuring system as claimed in claim 35, wherein the output signal of the analog to digital converter at a given time represents exactly one of the two temperature measurement signals.

37. The measuring system as claimed in claim 36, wherein the measuring- and operating electronics is adapted to generate the transducer temperature measured value with application of output signal of the analog to digital converter representing, alternatingly, one of the two temperature measurement signals.

38. The measuring system as claimed in claim 1,
wherein the measuring- and operating electronics is adapted, with application of both the first temperature measurement signal as well as also the second temperature measurement signal to generate a measured fluid temperature measured value, namely a measured value representing a temperature of a fluid flowing through the first tube and/or a temperature of a fluid flowing through the second tube; and/or wherein the measuring- and operating electronics is adapted, with application of the first temperature measurement signal and not of the second temperature measurement signal to generate an auxiliary temperature measured value, which at least approximately represents the transducer apparatus temperature; and/or wherein the measuring- and operating electronics is adapted, with application of the second temperature measurement signal and not of the first temperature measurement signal to generate an auxiliary temperature measured value, which at least approximately represents the transducer apparatus temperature.

39. Use of a measuring system as claimed in claim 1 for measuring at least one physical, measured variable of a flowing fluid.

* * * * *